United States Patent
Kwon

(10) Patent No.: US 8,031,774 B2
(45) Date of Patent: *Oct. 4, 2011

(54) VIDEO ENCODING METHODS AND SYSTEMS WITH FRAME-LAYER RATE CONTROL

(75) Inventor: Do-Kyoung Kwon, Kyunggi (KR)

(73) Assignee: Mediatek Incoropration, Hsin-Chu (TW)

( * ) Notice: Subject to any disclaimer, the term of this patent is extended or adjusted under 35 U.S.C. 154(b) by 2013 days.

This patent is subject to a terminal disclaimer.

(21) Appl. No.: 11/047,039

(22) Filed: Jan. 31, 2005

(65) Prior Publication Data

US 2006/0171456 A1    Aug. 3, 2006

(51) Int. Cl.
*H04N 7/12* (2006.01)
*H04B 1/66* (2006.01)

(52) U.S. Cl. .............................. 375/240.16; 375/240.24

(58) Field of Classification Search .................. 348/446, 348/441, 475, 460, 461, 462, 463, 464, 465, 348/466, 467, 468; 382/100, 232, 284, 248, 382/250; 386/35, 111, 112, 109, 129, 46, 386/100; 375/240.03, 240.02, 240.16, 240.12, 375/240.01, 240, 240.25, 245, 240.26, 240.2, 375/240.24

See application file for complete search history.

(56) References Cited

U.S. PATENT DOCUMENTS

| | | | |
|---|---|---|---|
| 5,764,805 A * | 6/1998 | Martucci et al. | 382/238 |
| 5,920,354 A * | 7/1999 | Fedele | 348/446 |
| 6,160,846 A * | 12/2000 | Chiang et al. | 375/240.05 |
| 2004/0114817 A1 * | 6/2004 | Jayant et al. | 382/239 |
| 2004/0170395 A1 * | 9/2004 | Filippini et al. | 386/111 |
| 2007/0009025 A1 * | 1/2007 | Kwon et al. | 375/240.03 |
| 2007/0009026 A1 * | 1/2007 | Kwon et al. | 375/240.03 |
| 2007/0147512 A1 * | 6/2007 | Eckart | 375/240.24 |

OTHER PUBLICATIONS

Video Encoding Methods and Systems with Frame-Layer Rate Control, Jan. 20, 1994, 1-60.*
"Optimal Trellis-Based Buffered Compression and Fast Approximations" Ortega et al.; Jan. 1994.
"Bit Allocation for Dependent Quantization with Applications to Multiresolution and MPEG Video Coders" Ramchandran, et al.; Sep. 1994.
"Rate Control of MPEG Video Coding and Recording by Rate-Quantization Modeling" Ding et al.; Feb. 1996.
"A New Rate Control Scheme Using Quadratic Rate Distortion Model" Chiang et al.; Feb. 1997.
"Bit-Rate Control Using Piecewise Approximated Rate-Distortion Characteristics" Lin et al.; Aug. 1998.
"Rate Control in DCT Video Coding for Low-Delay Communications" Ribas-Corbera et al.; Feb. 1999.
"Low-Delay Rate Control for DCT Video Coding via $\rho$-Domain Source Modeling" He et al.; Aug. 2001.

(Continued)

*Primary Examiner* — Behrooz Senfi

(74) *Attorney, Agent, or Firm* — Thomas|Kayden

(57) ABSTRACT

A frame-layer rate control method, and a video encoding method and system. In a first-step encoding stage, a QP of a previous frame is used to determine MVs and MB modes for all MBs in a current frame through R-D optimization, and the residual signal is encoded and then decoded for intra prediction. The residual signal is stored and the number of header bits is estimated from the determined MB modes and MVs. Given a target bit-rate for the current frame, a new QP is determined by a rate model. In a second-step encoding stage, the residual signal is encoded and reconstructed for both intra-prediction of subsequent MBs and inter prediction of subsequent frames using the new QP.

31 Claims, 25 Drawing Sheets

OTHER PUBLICATIONS

"Rate Control for Advance Video Coding (AVC) Standard" Ma et al.; 2003.

"A Study of MPEG-4 Rate Control Scheme and Its Improvements" Pan et al.; May 2003.

"On-Line Improvements of the Rate-Distortion Performance in MPEG-2 Rate Control" Grecos et al.; Jun. 2003.

"Adaptive Frame Layer Rate Control for H.264" Pan et al.; 2003.

* cited by examiner

VIDEO ENCODING METHODS AND SYSTEMS WITH FRAME-LAYER RATE CONTROL

BACKGROUND

The invention relates to frame-layer rate control for video encoders, and more specifically, to video encoding methods and systems with frame-layer rate control.

A wide range of new applications in visual communications as well as rapidly evolving telecommunication and computer technology have led to the development of various video coding standards. Some video coding standards, for example, MPEG-1, MPEG-2, and MPEG-4, are designed for non-conversational applications such as storage, streaming, and broadcasting. Other video coding standards, for example, H.261 and H.263, are designed for conversational applications such as video telephony and conferencing. Video coding standards typically comprise building blocks including discrete cosine transform (DCT), motion estimation (ME) or motion compensation (MC), quantization, and variable length coding (VLC). The quantizer step-size used for a frame or a macroblock (MB) impacts the encoded video quality, and an appropriate rate control algorithm should be utilized to determine the quantizer step-size for a given application and coding environment. Thus, rate control has been studied extensively.

Rate control algorithms can be generally classified into two categories, single-pass and multi-pass, according to the number of encoding passes of video sequences. Single-pass rate control algorithms are implemented while the given video sequence is encoded only once, and are used for real-time encoding applications where future frames are not available and long encoding delay is not permitted. Exemplary single-pass algorithms are described in MPEG-2 Test Model Test Model 5 (TM5) Doc., Test Model Editing Committee, ISO/IEC JTC1/SC29/WG11/93-255b, Apr. 1993; C. Crecos and J. Jiang, "On-line improvement of the rate-distortion performance in MPEG-2 rate control," IEEE Trans. Circuits Syst. Video Technol., pp. 519-528, June 2003; T. Chiang and Y.-Q. Zhang, "A new rate control scheme using a new rate-distortion model," IEEE Trans. Circuits Syst. Video Technol., pp. 246-250, Feb. 1997; F. Pan, Z. Li, K. Lim, and G. Feng, "A study of MPEG-4 rate control scheme and its improvements," IEEE Trans. Circuits Syst. Video Technol., pp. 440-446, May 2003; J. Ribas-Corbera and S. Lei, "Rate control in DCT video coding for low-delay communications," IEEE Trans. Circuits Syst. Video Technol., pp. 172-185, Feb. 1999; and Z. He, Y. K. Kim, and S. K. Mitra, "Low-delay rate control for DCT video coding via rho-domain source modeling," IEEE Trans. Circuits Syst. Video Technol., pp. 928-940, Aug. 2001.

Multi-pass rate control algorithms encode the given video sequence several times to optimally determine the quantizer step-size, and are typically utilized in applications where encoding delay is not a concern or the encoding procedure can be executed offline, for example, video streaming and storage. Exemplary multi-pass algorithms are described in A. Ortega, K. Ramchandran, and M. Vetterli, "Optimal trellis-based buffered compression and fast approximation," IEEE Trans. Image Processing, pp. 26-40, Jan. 1994; K. Ramchandran, A. Ortega, and M. Vetterli, "Bit allocation for dependent quantization with applications to multi-resolution and MPEG video coders," IEEE Trans. Image Processing, pp. 533-545, Sept. 1994; L. J. Lin and A. Ortega, "Bit-rate control using piecewise approximated rate-distortion characteristics," IEEE Trans. Circuits Syst. Video Technol., pp. 446-459, Aug. 1998; and W. Ding and E. Liu, "Rate control of MPEG video coding and recording by rate-quantization modeling," IEEE Trans. Circuits Syst. Video Technol., pp. 12-20, Feb. 1996.

Rate control algorithms can also be classified into three categories according to the quantizer step-size determination methods, including direct buffer-state feedback methods, model-based analytical methods, and operational rate-distortion (R-D) modeling methods. Direct buffer-state feedback methods determine the quantizer step-size based on the level of buffer fullness and activity. Model-based analytical methods utilize several rate and distortion models for rate control, for example, rate is modeled as a quadratic function of the quantizer step-size. In general, direct buffer-state feedback and model-based analytical methods fall into the category of single-pass rate control algorithms. Operational R-D modeling methods may use dynamic programming and Lagrange optimization methods to determine quantizer step-size of frames within a group of pictures (GOP). Excessive computational complexity prevents most operational R-D modeling methods from being used for real-time rate control. Model-based operational R-D modeling has been proposed to reduce computational complexity, where models are used to predict the R-D characteristics of input video sequence from a limited number of control points at the expense of accuracy. These methods, however, are still computationally burdensome for real-time encoding and require encoding delay to some extent.

H.264 is a video standard for both conversational and non-conversational applications, which achieves a significant coding gain over other coding standards by introducing various new coding techniques such as intra prediction, various block shapes and multiple reference frames for inter prediction with R-D optimized motion estimation and mode decision, which will be called RDO hereafter.

Several single-pass rate control algorithms are proposed for H.264 encoding. An exemplary partial two-pass algorithm for an H.264 encoder proposed by S. Ma, W. Gao, P. Gao, and Y. Lu in "Rate control for advance video coding (AVC) standard," in Proc. Int. Conference, Circuits Syst., pp. 25-28, May 2003, provides MB-layer rate control based on the MPEG-2 TM5 rate control algorithm. Given the target bit-rate for the frame, a quantizer parameter (QP) of the previous MB is used to perform RDO for the current MB so that the previous QP serves as an estimated QP for the current MB. A new QP for the current MB is decided based on the level of buffer fullness and the MB activity after RDO. The residual signal of the current MB is quantized with the original estimated QP if the difference between the previous QP and the new QP is below a threshold. Otherwise, RDO is performed again for the current MB using the new QP and residual signal is also quantized with the new QP.

A single-pass frame-layer rate control algorithm for an H.264 encoder base on the quadratic rate model has been proposed by Z. G. Li, F.Pan, K. P. Lim, G. N. Feng, X. Lin, S. Rahardja, and D. J. Wu in "Adaptive frame layer rate control for H.264," in Proc. Int. Conference, Multimedia Expo, pp. 581-584, June 2003. Since residual signal is not available before RDO due to the interdependency between RDO and rate control, a linear model has been introduced to predict the mean absolute difference (MAD) of the residual signal of the current frame and the previous frame. The linear model, however, cannot estimate the MAD of the current frame precisely, particularly for sequences where the amount of motion varies significantly from frame to frame.

Many rate control algorithms developed for H.264 fail to address the problems caused by interdependency between RDO and rate control as the residual signal is not yet available before determining the new QP for the MB or frame. Another problem is that an importance of the number of header bits in the rate control for H.264 encoders is disregarded. H.264 is different from other video coding standards since intra prediction and multiple reference frames with variable block sizes are used for motion estimation and mode decision. Since this kind of information should be encoded, the number of header bits takes a large portion out of the total number of bits, and it varies frame by frame and MB by MB. Therefore, accurate information on the number of header bits is required in rate control algorithms for H.264 because it cannot be estimated using the level of buffer capacity and rate model.

SUMMARY

Frame-layer rate control methods, and video encoding methods and systems with single-pass frame rate control are provided. Some embodiments of the provided methods and system are implemented in H.264 encoders. An exemplary embodiment of a frame-layer rate control method comprises: allocating a target number of bits to a current frame; encoding macroblocks of the current frame using a quantizer parameter of a previous frame to obtain a residual signal and an estimated number of header bits of the current frame; evaluating a complexity of the current frame based on the residual signal of the current frame; and determining a new quantizer parameter for the current frame based on the target number of bits, the estimated number of header bits, and the complexity of the current frame.

An exemplary embodiment of a video encoding method with single-pass frame rate control comprises: allocating a target number of bits to a current frame; performing first-step encoding on macroblocks of the current frame using a quantizer parameter of a previous frame to obtain a residual signal and an estimated number of header bits of the current frame; evaluating a complexity of the current frame based on the residual signal of the current frame; determining a new quantizer parameter for the current frame based on the target number of bits, the estimated number of header bits, and the complexity of the current frame; and performing second-step encoding on the residual signal of the current frame using the newly determined quantizer parameter.

Some embodiments of a video encoding system with single-pass frame rate control comprise a first-step encoding device, a rate control device, and a second-step encoding device. The first-step encoding device is operative to obtain a residual signal and an estimated number of header bits of a current frame by encoding macroblocks of the current frame using a quantizer parameter of a previous frame. The rate control device allocates a target number of bits to the current frame, evaluates a complexity of the current frame based on the residual signal of the current frame, and determines a new quantizer parameter for the current frame based on the target number of bits, the estimated number of header bits, and the complexity of the current frame. The second-step encoding device is operative to generate an output bitstream by encoding the residual signal of the current frame using the new quantizer parameter of the current frame.

DESCRIPTION OF THE DRAWINGS

The invention can be more fully understood by reading the subsequent detailed description in conjunction with the examples and references made to the accompanying drawings, wherein.

DETAILED DESCRIPTION

Figure 1:
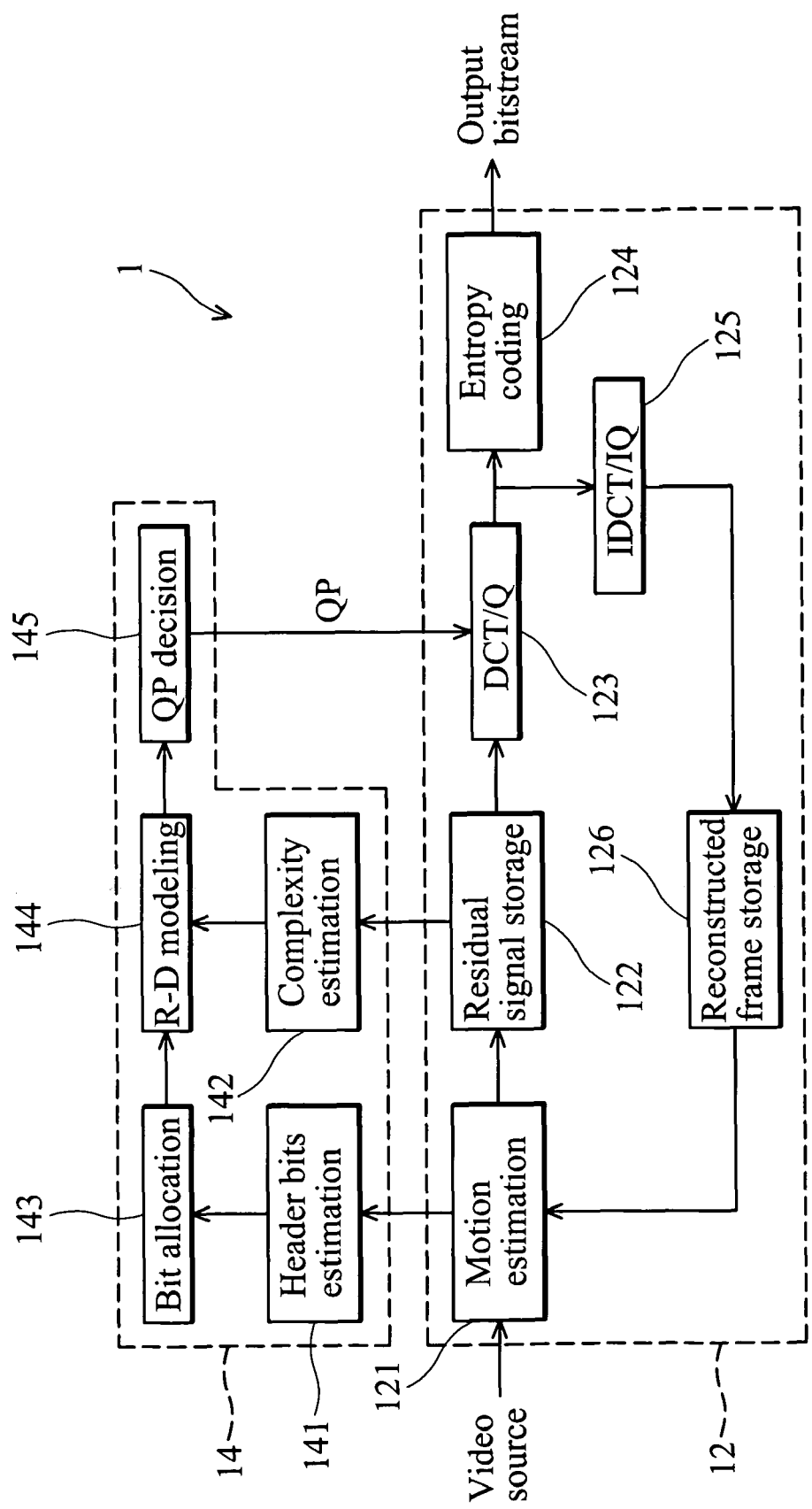
FIG. 1 is a block diagram illustrating a single pass rate control algorithm.

Frame-layer rate control methods and systems for video signals are provided. FIG. 1 is a block diagram illustrating a video encoder with a single-pass rate controller 1 for previous video standards other than H.264, incorporating a video encoder device 12 and a rate control device 14. The video encoder 12 comprises a motion estimation unit 121, a residual signal storage unit 122, a DCT and quantization unit 123, an entropy coding unit 124, an inverse DCT and inverse quantization unit 125, and a reconstructed frame storage unit 126. The rate control device 14 interacts with the video encoder device 12 to update QP for an MB and/or a frame and comprises a header bit estimation unit 141, a complexity estimation unit 142, a bit allocation unit 143, an R-D modeling unit 144, and a QP decision unit 145. The header bits estimation unit 141 estimates the number of header bits for the MB or frame after motion estimation, and the complexity estimation unit 142 estimates the complexity of a residual signal. The number of header bits and the complexity of residual signal both are necessary for bit allocation and R-D modeling. The bit allocation unit 143 computes the number of bits necessary for a given MB or frame based on buffer status, channel bandwidth and relevant encoding conditions. The rate and/or distortion models are updated using actual encoding data of the previous MBs or frames in the R-D modeling unit 144, and the QP for the current MB or frame is decided before DCT and quantization in the QP decision unit 145.

For the H.264 encoder, a single-pass rate control algorithm is implemented using a similar approach as the single-pass rate controller 1 shown in FIG. 1. This approach, however, cannot be precisely applied to H.264 encoders due to interdependency between rate control and RDO. Given a QP value, an H.264 encoder chooses a best reference frame and a best MV for each partition of MB as well as a best MB mode through RDO by minimizing:

$$J_{QP}(S_{QP}) = D(S_{QP}) + \lambda(QP) \cdot R(S_{QP}) \quad [1]$$

where $S_{QP}$ is a set of MVs, reference frames, and MB mode, and $\lambda$ (QP) is Lagrange multipliers. There are two Lagrange multipliers used for motion estimation and mode decision respectively, and these Lagrange multipliers are functions of the given QP as follows:

$$\lambda_{MODE}(QP) = \quad [2]$$
$$\begin{cases} 0.85 \times 2^{\frac{QP}{3}} & \text{for } I, P \text{ frame}, \lambda_{MOTION}(QP) = \sqrt{\lambda_{MODE}(QP)} \\ 4 \times 0.85 \times 2^{\frac{QP}{3}} & \text{for } B \text{ frame} \end{cases}$$

In other words, given the two Lagrange multipliers based on the given QP, the H.264 encoder chooses the best set of MVs, reference frames, and best MB mode for each MB which satisfies:

$$S_{\hat{QP}} = \mathrm{argmin}\, J_{QP}(S_{QP}) \quad [3]$$

Figure 2:
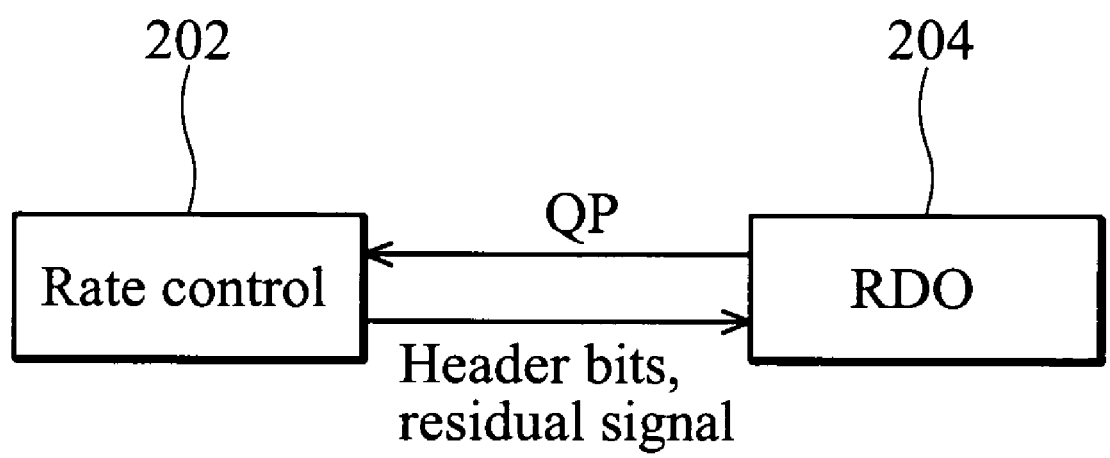
FIG. 2 illustrates the interdependency problem between RDO and rate control.

FIG. 2 shows the interdependency between rate control 202 and RDO 204. Rate control 202 determines a QP value using information including the residual signal such as MAD and the number of header bits. Unfortunately, such information becomes available only after the rate distortion optimization (RDO) in the H.264 encoder. Moreover, all information after RDO 204 depends on the QP since RDO 204 is performed on the basis of the Lagrange optimization method as shown in Equation 1, where Lagrange multipliers are function of QP as shown in Equation 2. Therefore determination of QP must be performed before applying RDO 204.

Z. G. Li et al. propose an adaptive frame layer rate control scheme, see "Adaptive frame layer rate control for H.264," in *Proc. Int. Conference, Multimedia Expo*, pp. 581-584, June 2003, which is currently adopted for the H.264 reference encoder. In this scheme, a single-pass rate control algorithm is realized by a quadratic rate model as follows:

$$R(Qs) = X_1 \cdot \frac{MAD}{Qs} + X_2 \cdot \frac{MAD}{Qs^2} \quad [4]$$

where $X_1$ and $X_2$ are model parameters, and Qs is quantizer step-size.

In equation 4, MAD of $n^{th}$ frame is predicted by MAD of $(n-1)^{th}$ frame according to a linear model of Equation 5 to resolve the interdependency problem illustrated in FIG. 2.

$$MAD_n = a \cdot MAD_{n-1} + b \quad [5]$$

where a and b are parameters.

Figure 3A:
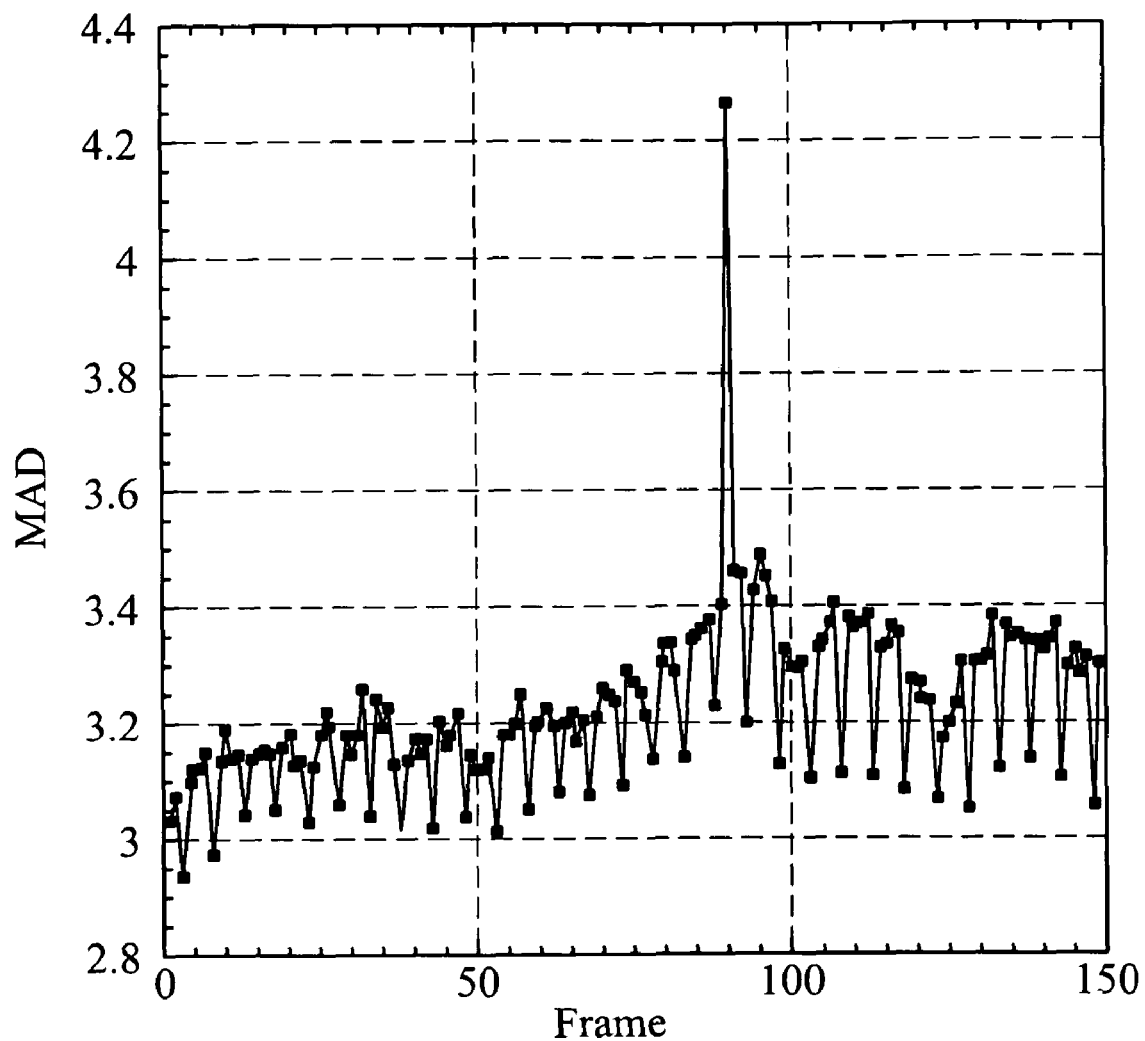
FIG. 3a and FIG. 3b show MAD of P-frame with three reference frames of two exemplary sequences ("news" and "grandma") of a QCIF-format.
Figure 3B:
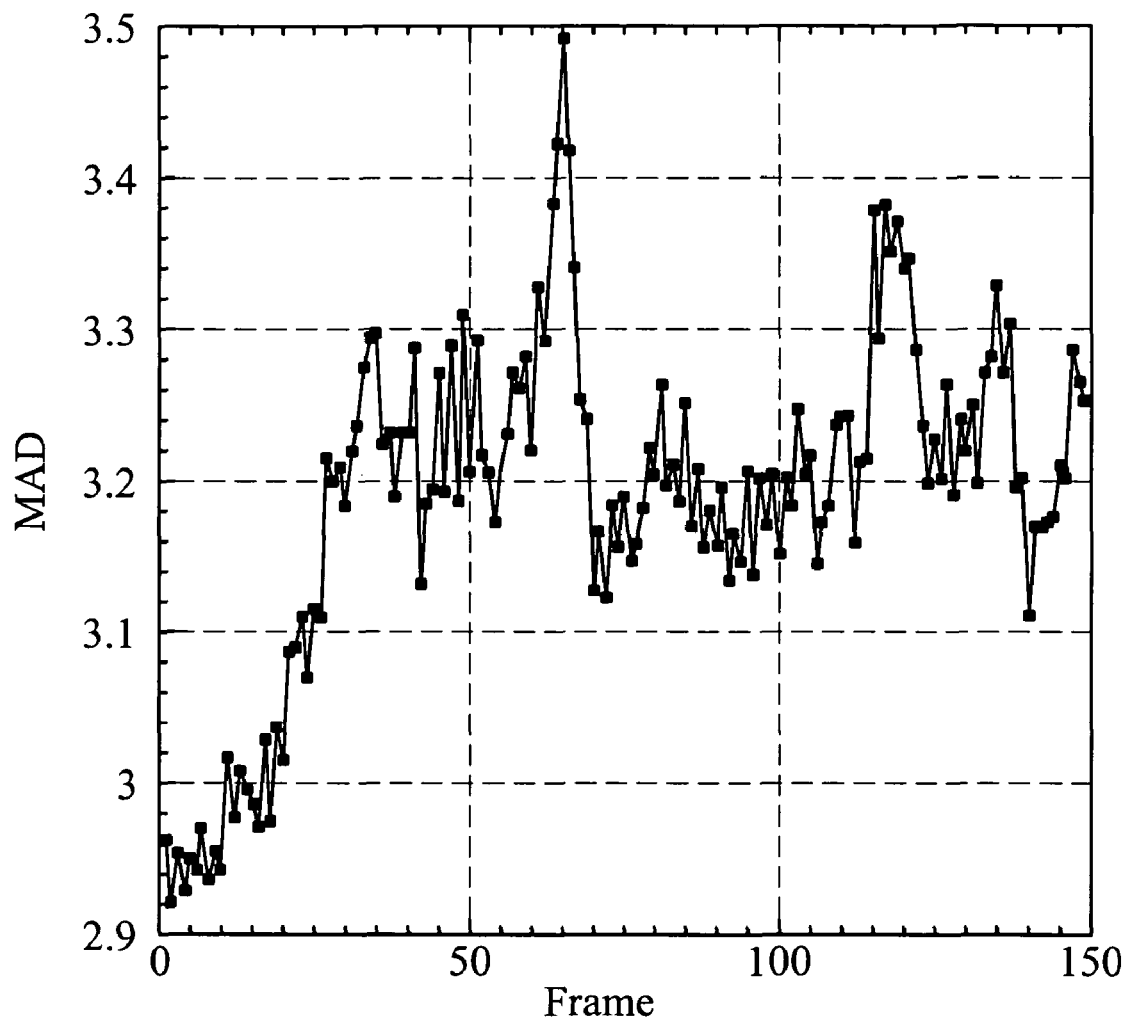

However, MAD cannot be precisely estimated by such a simple model, especially when the video sequence consists of frames with varying characteristics. FIGS. 3a and 3b show the MAD fluctuation of P-frame of two QCIP-format sequences when three reference frames are used for inter prediction. MADs of a current frame and previous frames have no distinct relationship. The model parameters of the quadratic rate model is updated using actual values of rate and MAD of previous frames after encoding each frame while the QP for current frame is determined using the estimated MAD based on Equation 5, which may be different from the actual MAD. Therefore, even though the rate model is accurate, accuracy of the rate model decreases due to the inaccurate MAD estimation.

Figure 4A:
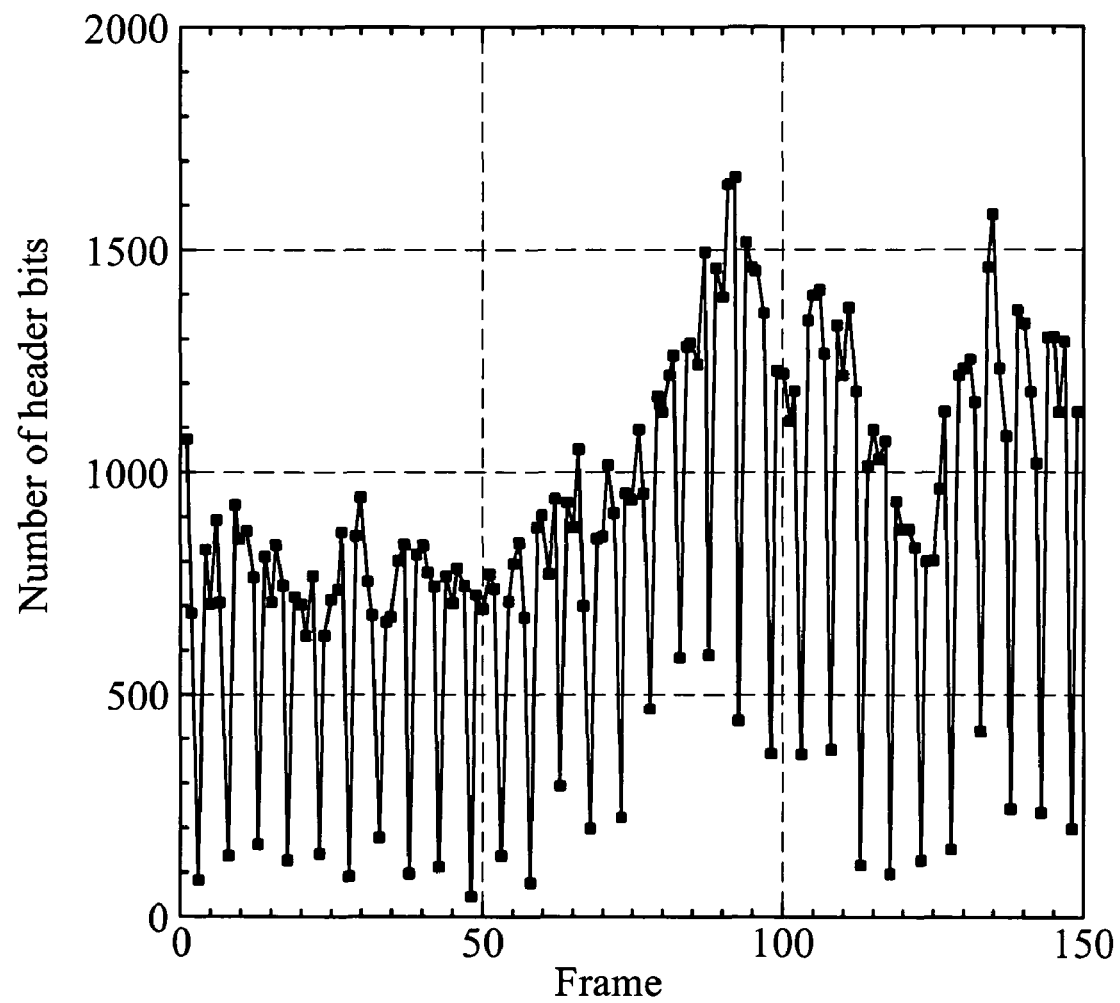
FIG. 4a and FIG. 4b show the number of header bits of P-frame with three reference frames corresponding to the exemplary sequences shown in FIGS. 3a and 3b.
Figure 4B:
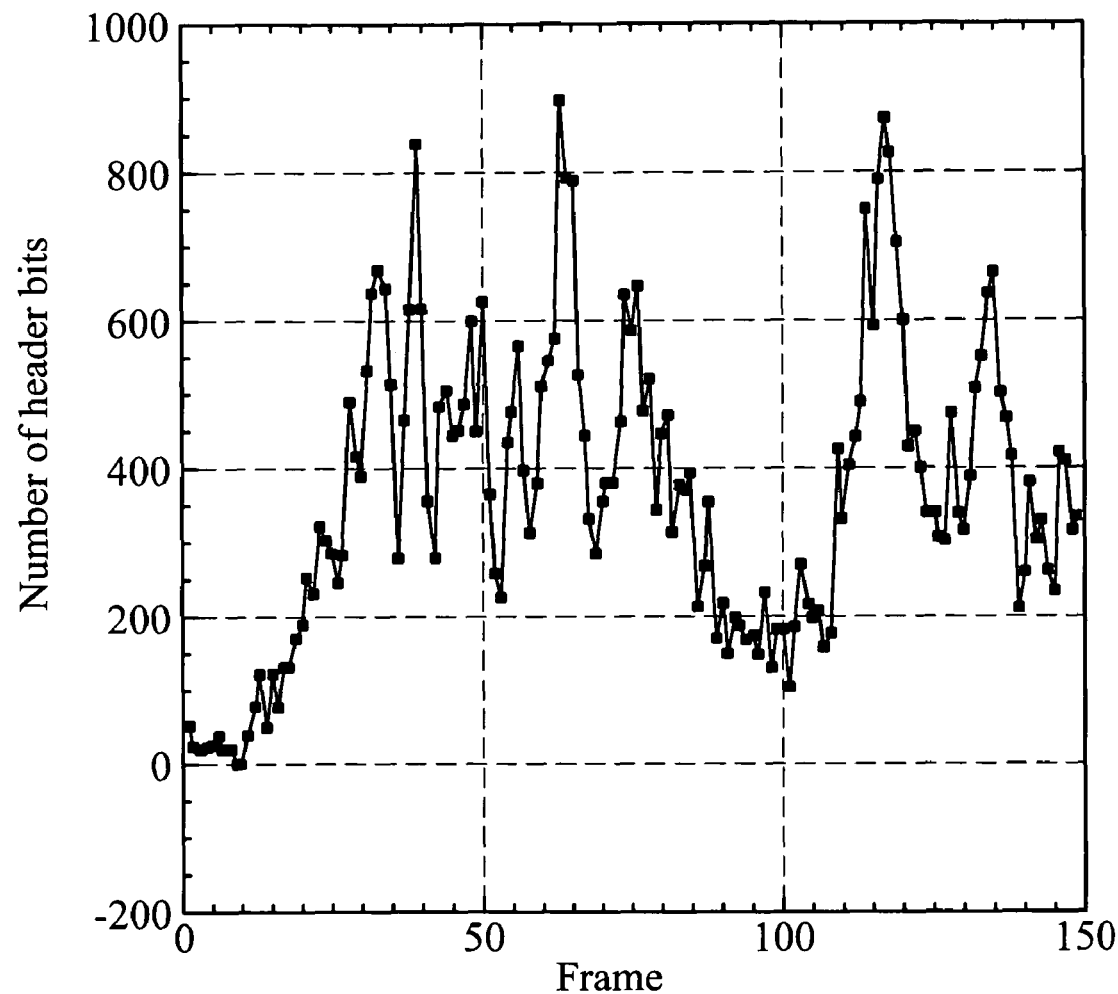
Figure 5A:
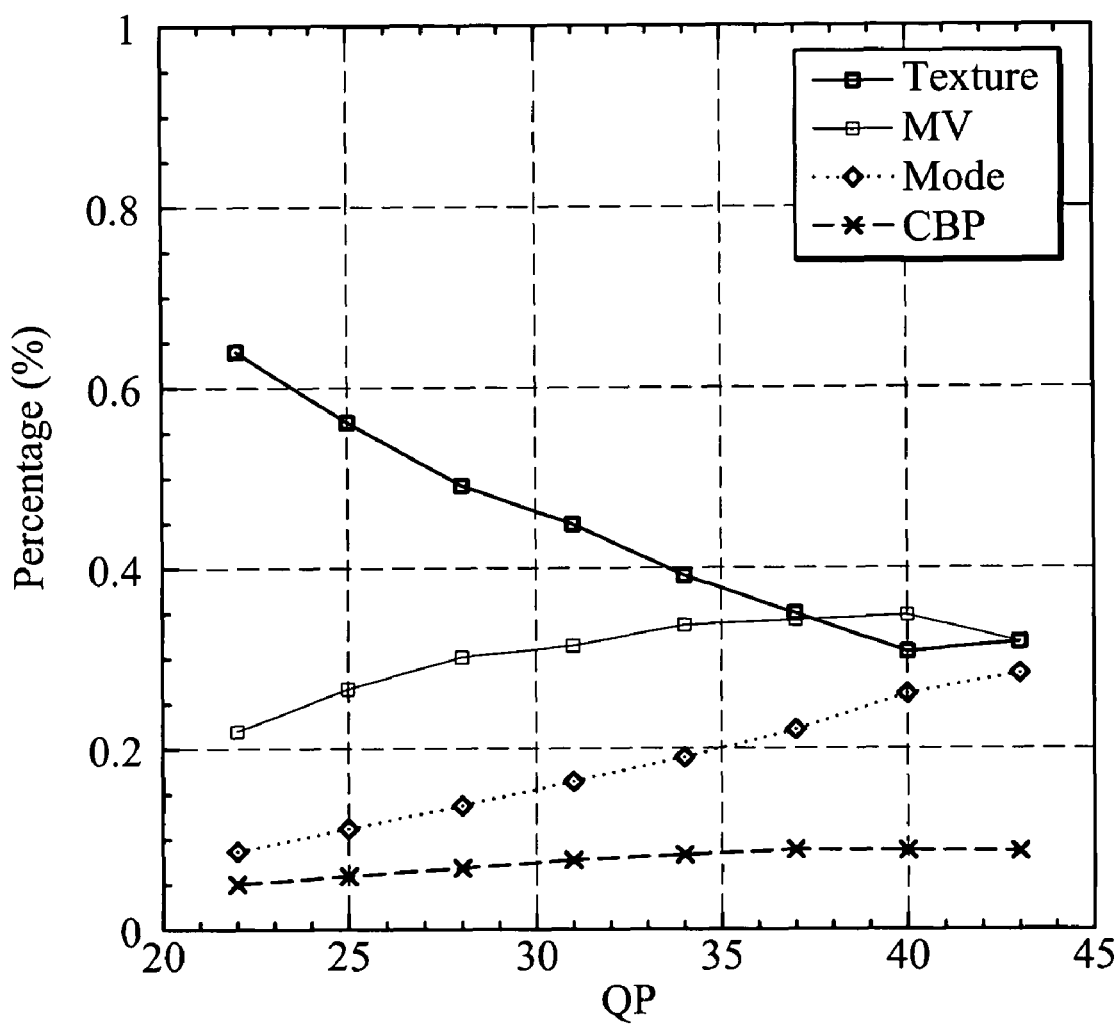
FIG. 5a and FIG. 5b show percentages of the number of header bits with single reference frame of two exemplary sequences ("carphone" and "hall") of QCIF-format.
Figure 5B:
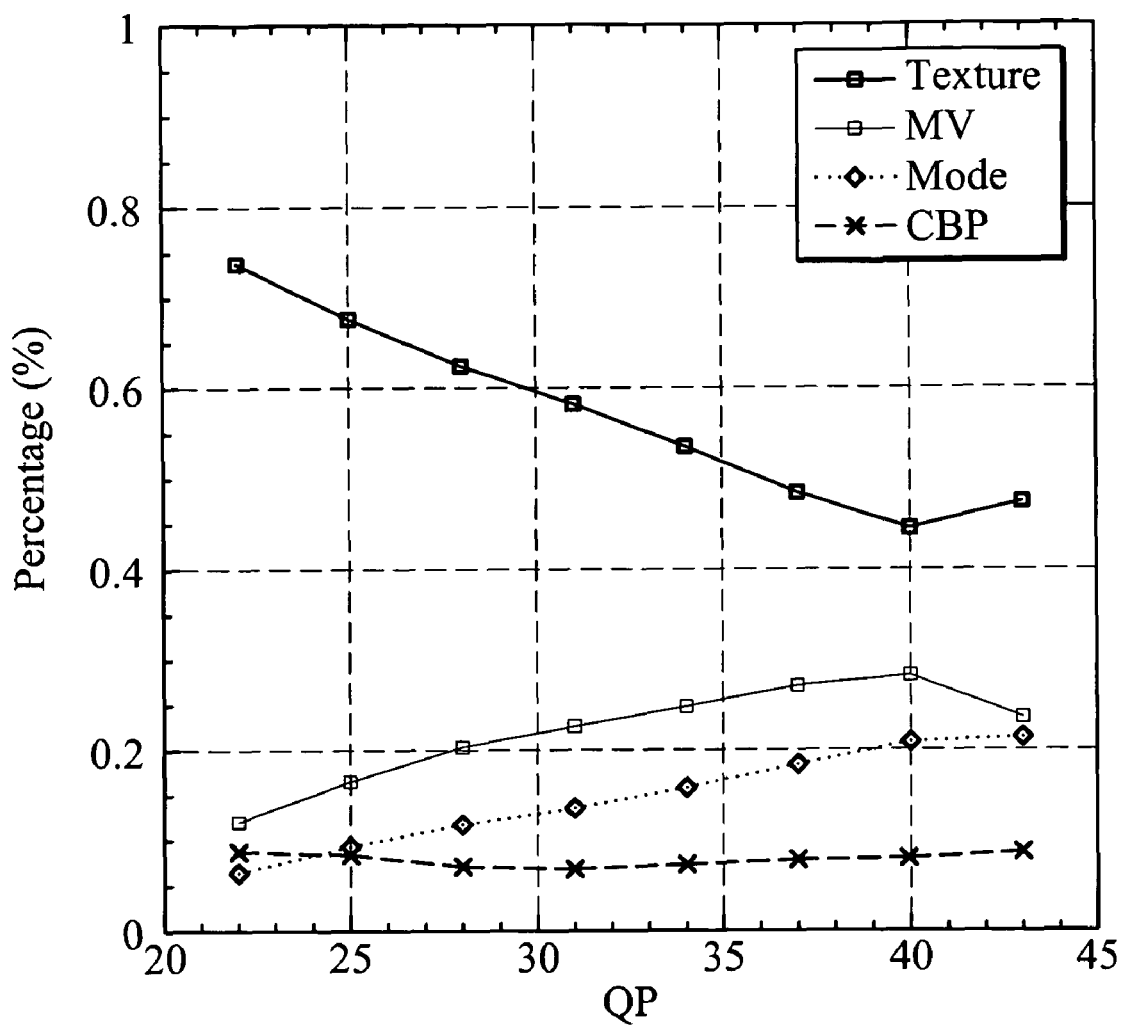
Figure 6A:
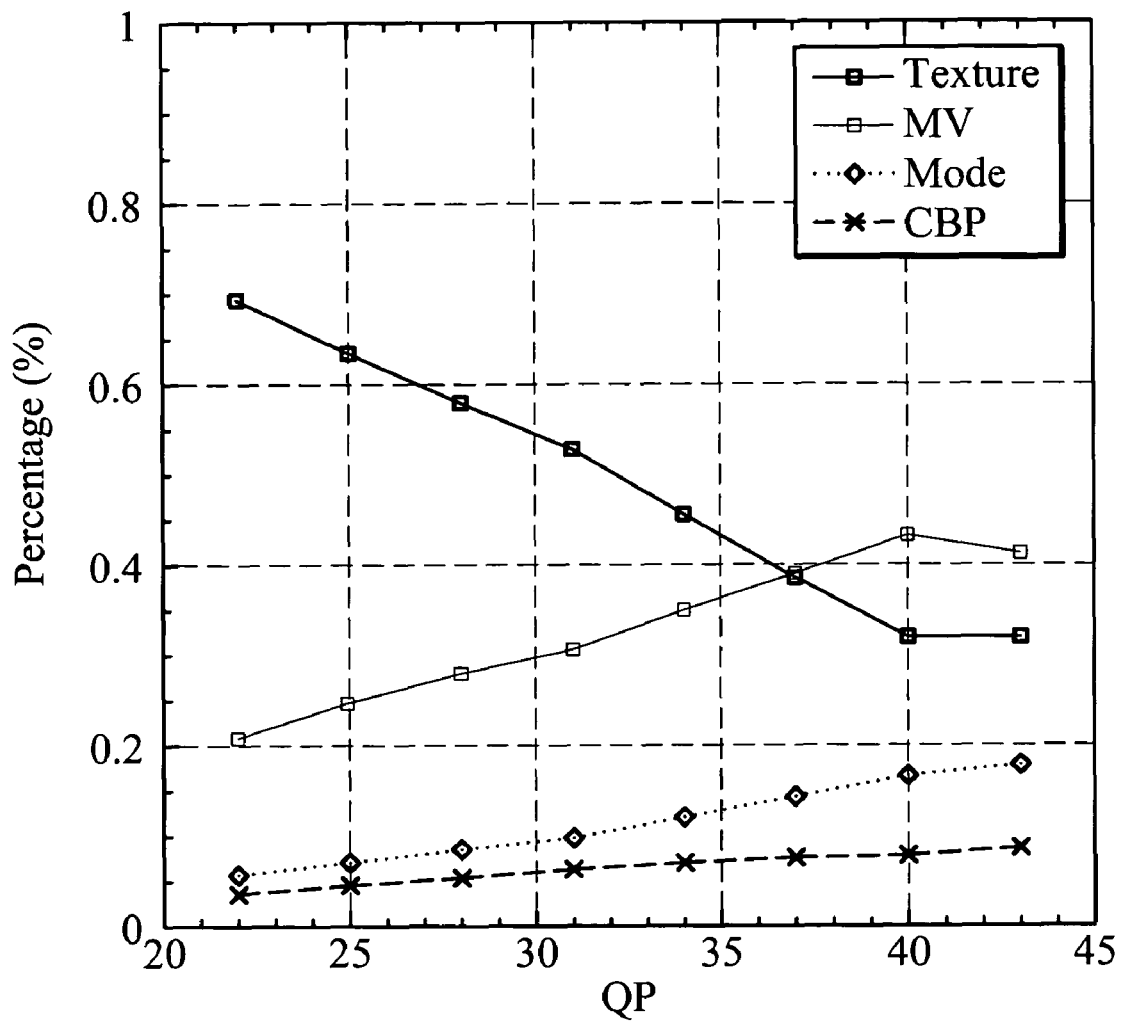
FIG. 6a and FIG. 6b show percentages of the number of header bits with five reference frames of two exemplary sequences ("table tennis" and "suzie") of QCIF-format.
Figure 6B:
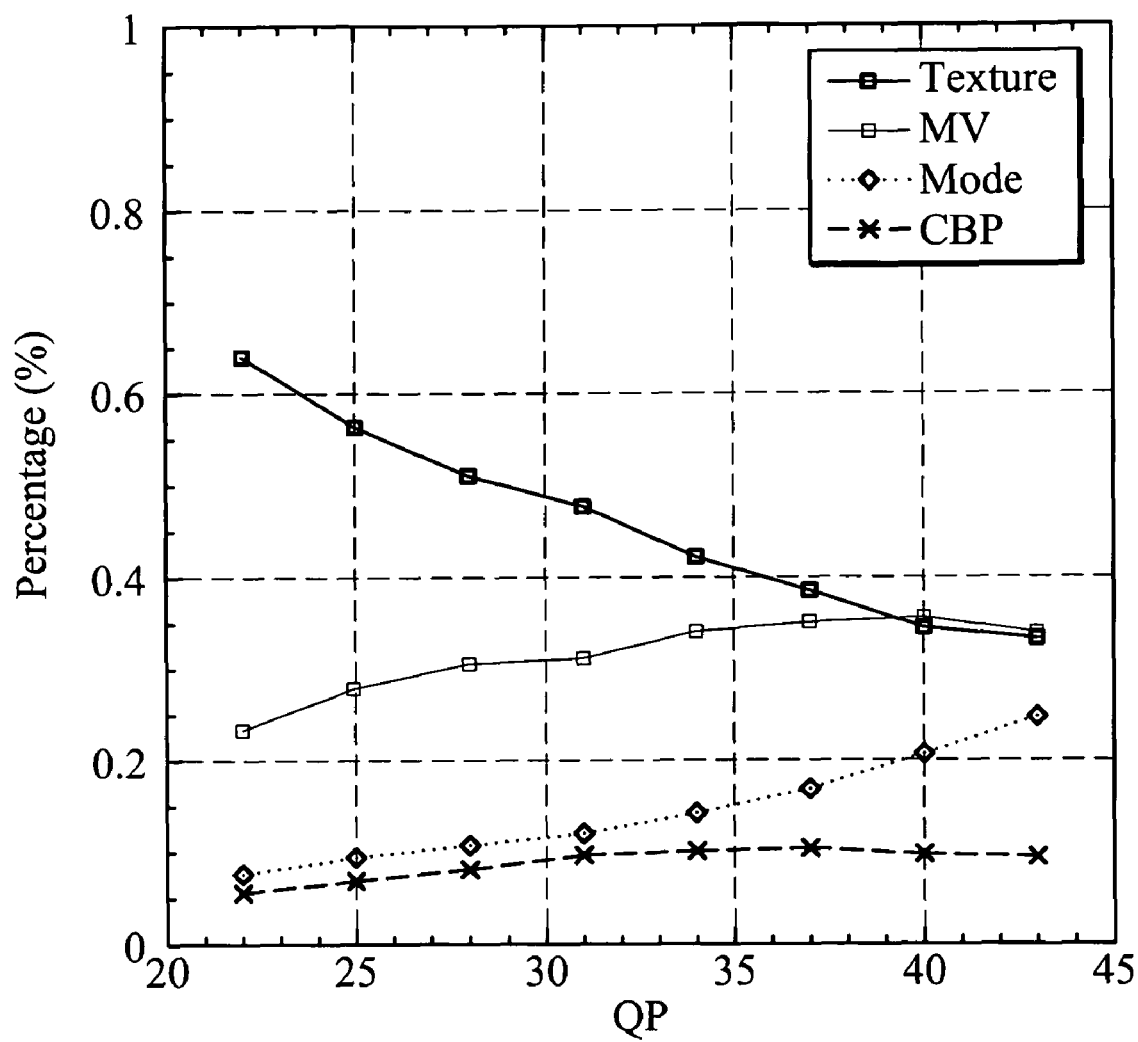
Figure 7A:
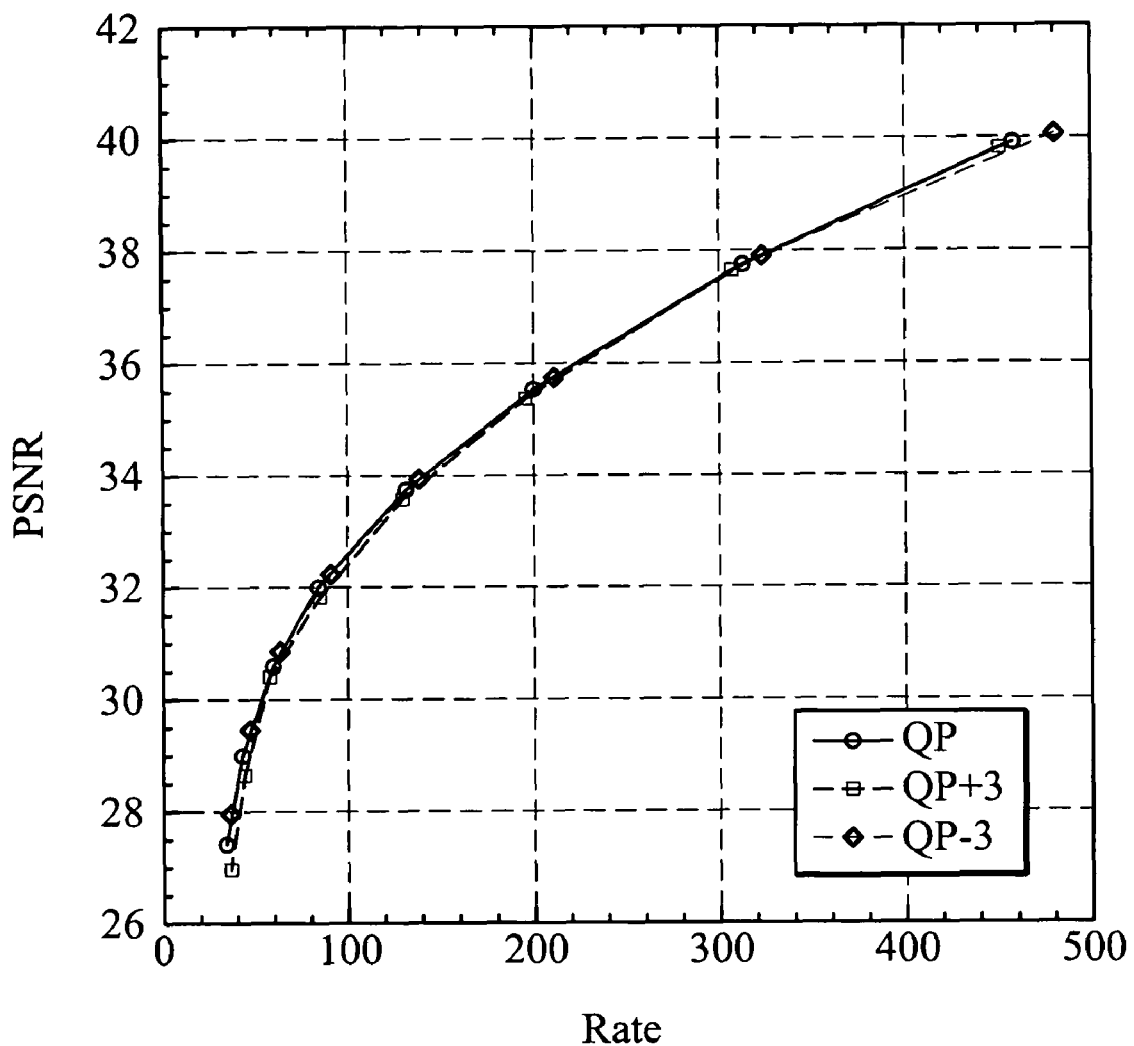
FIG. 7a and FIG. 7b show R-D curves of two exemplary sequences ("table tennis" and "mother & daughter") of QCIF-format when a different $QP_{RO}$ is used while the same $QP_G$ is used with a single reference frame.
Figure 7B:
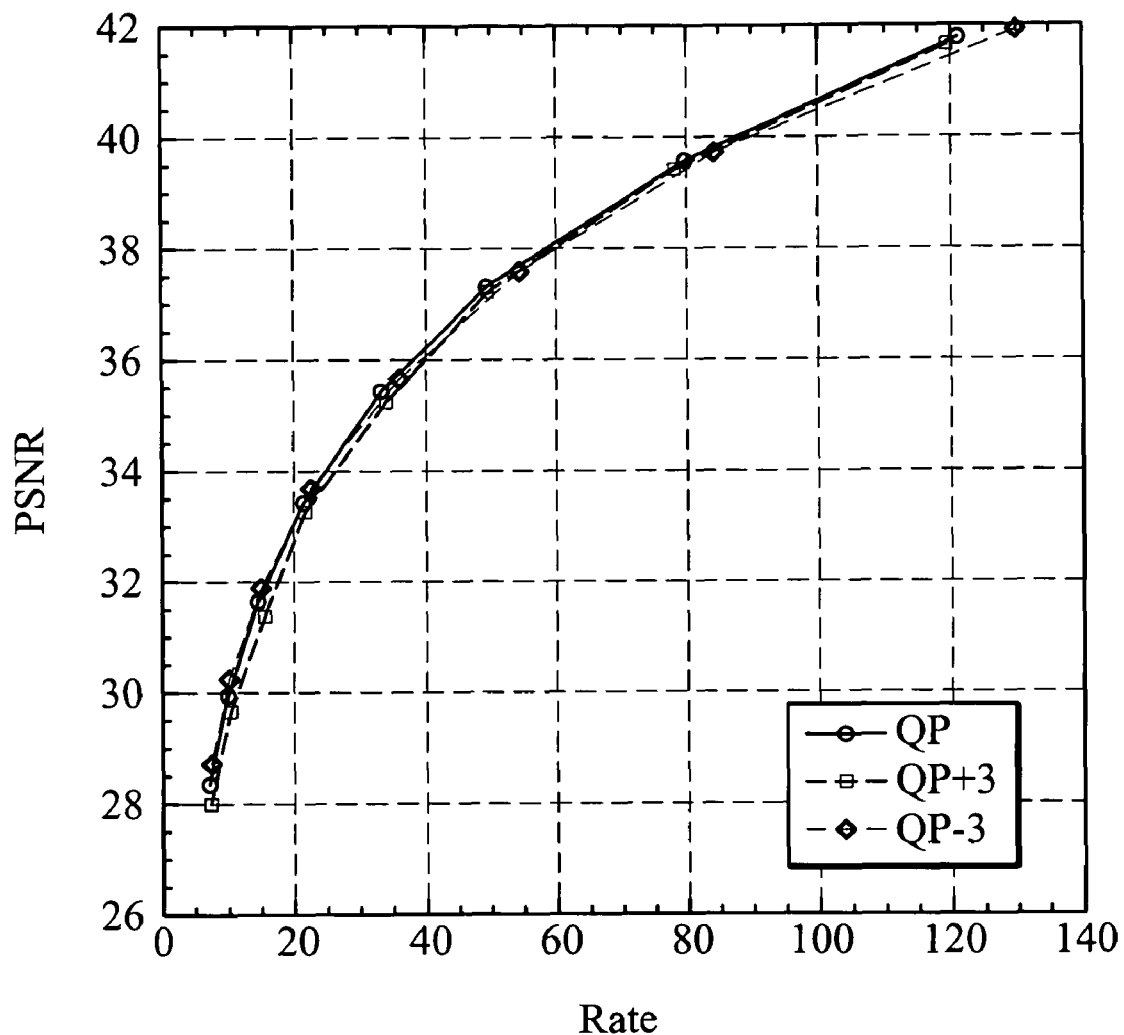
Figure 8A:
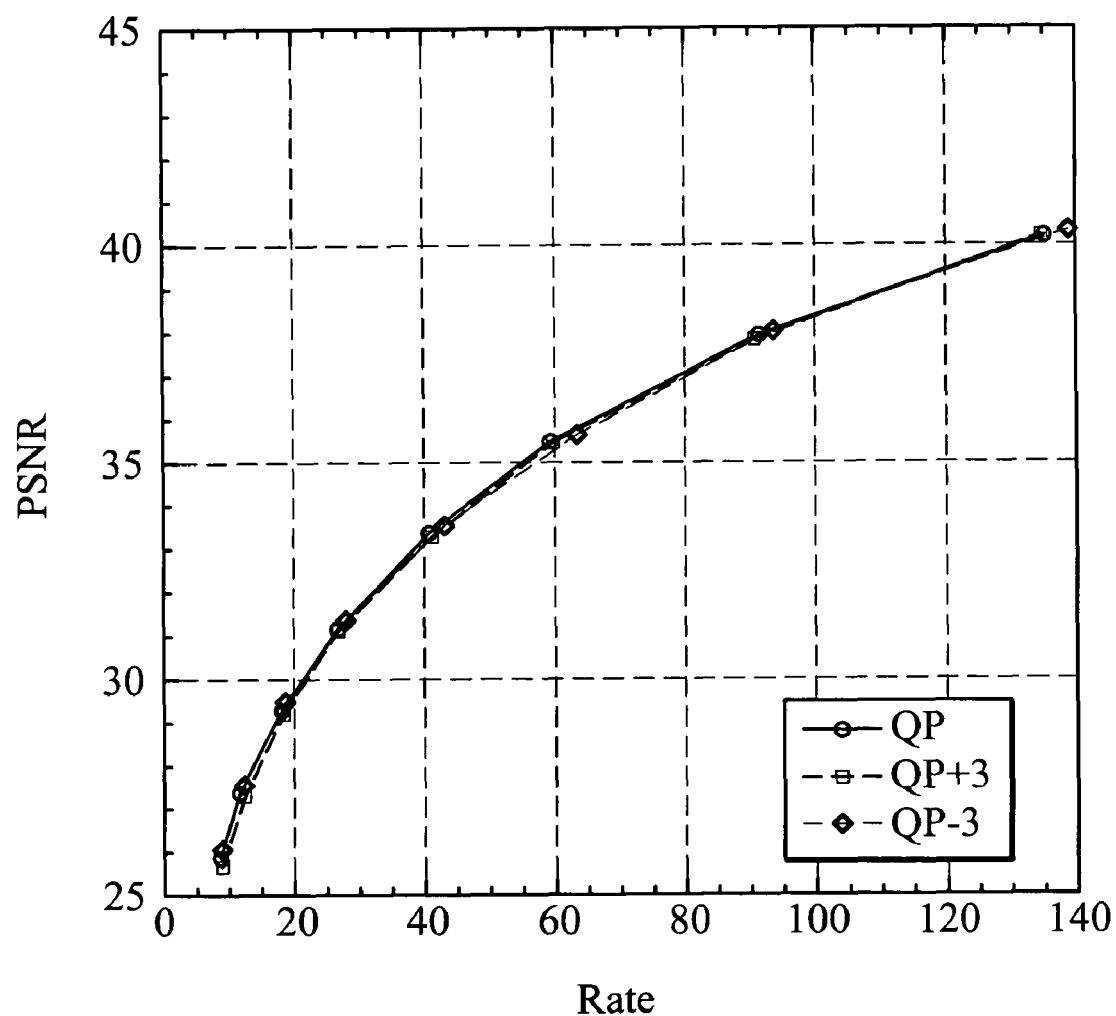
FIG. 8a and FIG. 8b show R-D curves of two exemplary sequences ("salesman" and "mobile") of QCIF-format sequences when a different $QP_{RO}$ is used while the same $QP_G$ is used with five reference frames.
Figure 8B:
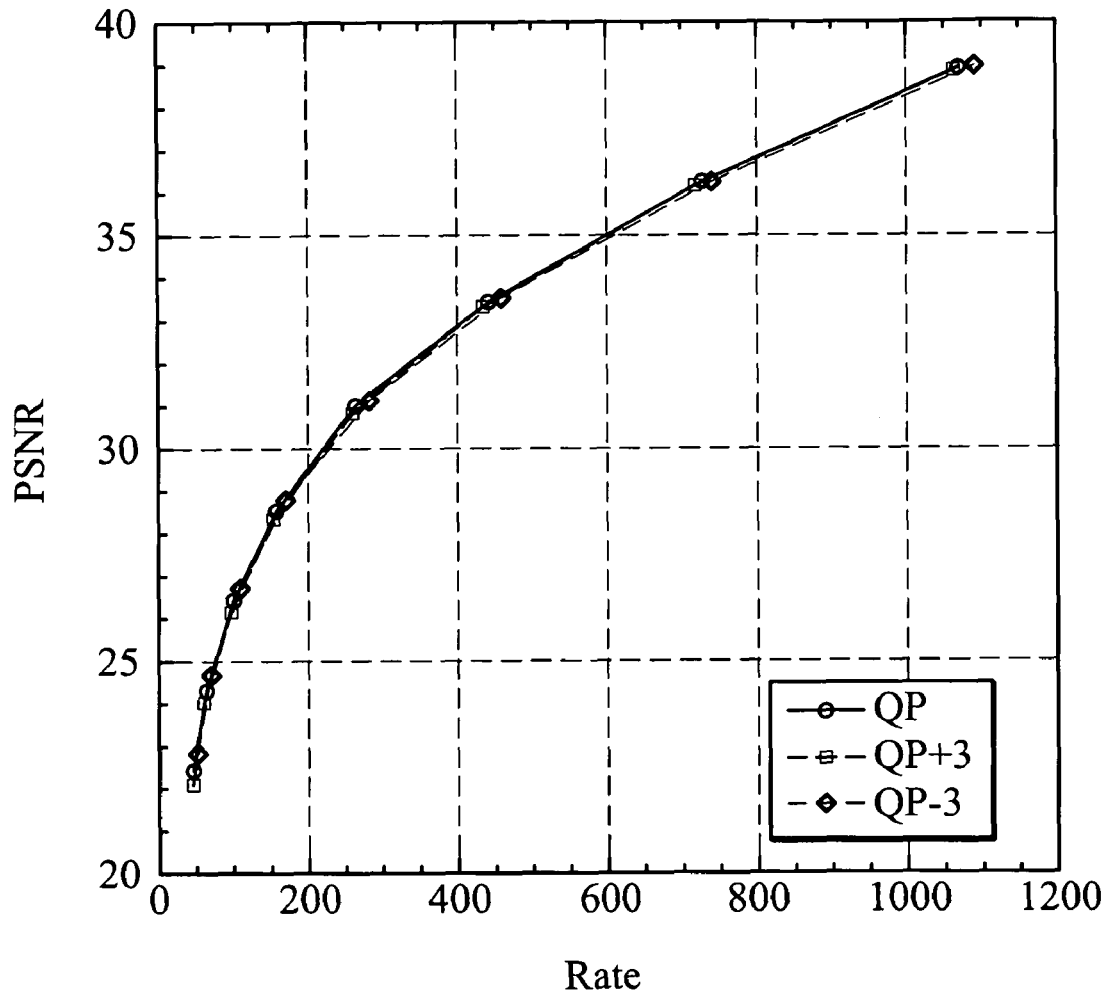

Another problem of the related art is that the influence of variable header bits is neglected. In the related art, the average number of header bits in the previous frames is used as an estimate of the number of header bits for the current frame. As shown in FIGS. 4a and 4b, however, the number of header bits of the current frame has nothing to do with those of previous frames. Moreover, accurate estimation of the number of header bits is critical in rate control for the H.264 encoders since the number of header bits makes up a large portion of the total number of bits. FIGS. 5a~5b, and 6a~6b show the percentage of the number of texture bits and header bits including MV, mode, and coded block pattern (CBP) of QCIP-format sequences with single and five reference frames respectively. In FIGS. 5a~5b, and 6a~6b, the percentage of the number of header bits is over 50% of the total number of bits at lower bit-rate, and this percentage generally increases with the number of reference frames. Accurate estimation of the number of header bits is required as the estimation affects the rate model and bit allocation significantly.

A single-pass frame-layer rate control algorithm with a two-step encoding scheme is provided now, which makes use of two different QPs for RDO and for quantization. Notations for description hereafter are as follows: $QP_G$, which is used for RDO of all MBs in the current frame, is a QP of the previous frame; $QP_{RO}$, which is determined by a rate model, is for quantization of a residual signal; $QP_n$ is a QP of the $n^{th}$ frame or the current frame; and $QP_{n-1}$ is a QP of the $(n-1)^{th}$ frame or the previous frame, which is the same to the $QP_{RO}$ of the $(n-1)^{th}$ frame.

In some embodiments, variation of QP values between two successive frames is restricted to a small range for smooth quality change as shown in Equation 6.

$$|QP_n - QP_{n-1}| \leq \Delta \text{ where } \Delta = 2 \text{ or } 3 \quad [6]$$

A QP is thus clipped to a certain range if the QP obtained by the R-D model varies greatly from the previous QP. The decrease of coding gain, i.e., the R-D performance, is not meaningful even though the difference between $QP_G$ for RDO and $QP_{RO}$ for quantization is different, given that the difference is restricted within a small range, $$|QP_G - QP_{RO}| \leq \Delta \text{ where } \Delta = 2 \text{ or } 3 \quad [7]$$

Since $QP_G$ is used for RDO, the encoder chooses the best set of MVs, reference frames and MB mode which satisfies:

$$S_{\hat{QP}_G} = \mathrm{argmin}\, J_{QPG}(S_{QPG}) \quad [8]$$

The decrease of R-D performance is negligible when $QP_{RO}$ is restricted as shown in Equation 7 even though the residual signal is quantized with $QP_{RO}$ after RDO. FIGS. 7a~7b and 8a~8b show R-D curves of QCIF-format sequences when different values of $QP_{RO}$ are used while the same $QP_G$ is used with single and five reference frames, respectively. In FIGS. 7a~7b and 8a~8b, $QP_G$ is set to QP for all curves while $QP_{RO}$ is set to QP-3, QP, and QP+3 for each curve. The R-D performances are almost the same given that the difference between the $QP_G$ and $QP_{RO}$ is small even though resulting bit-rates with the same QP are slightly different.

Figure 9:
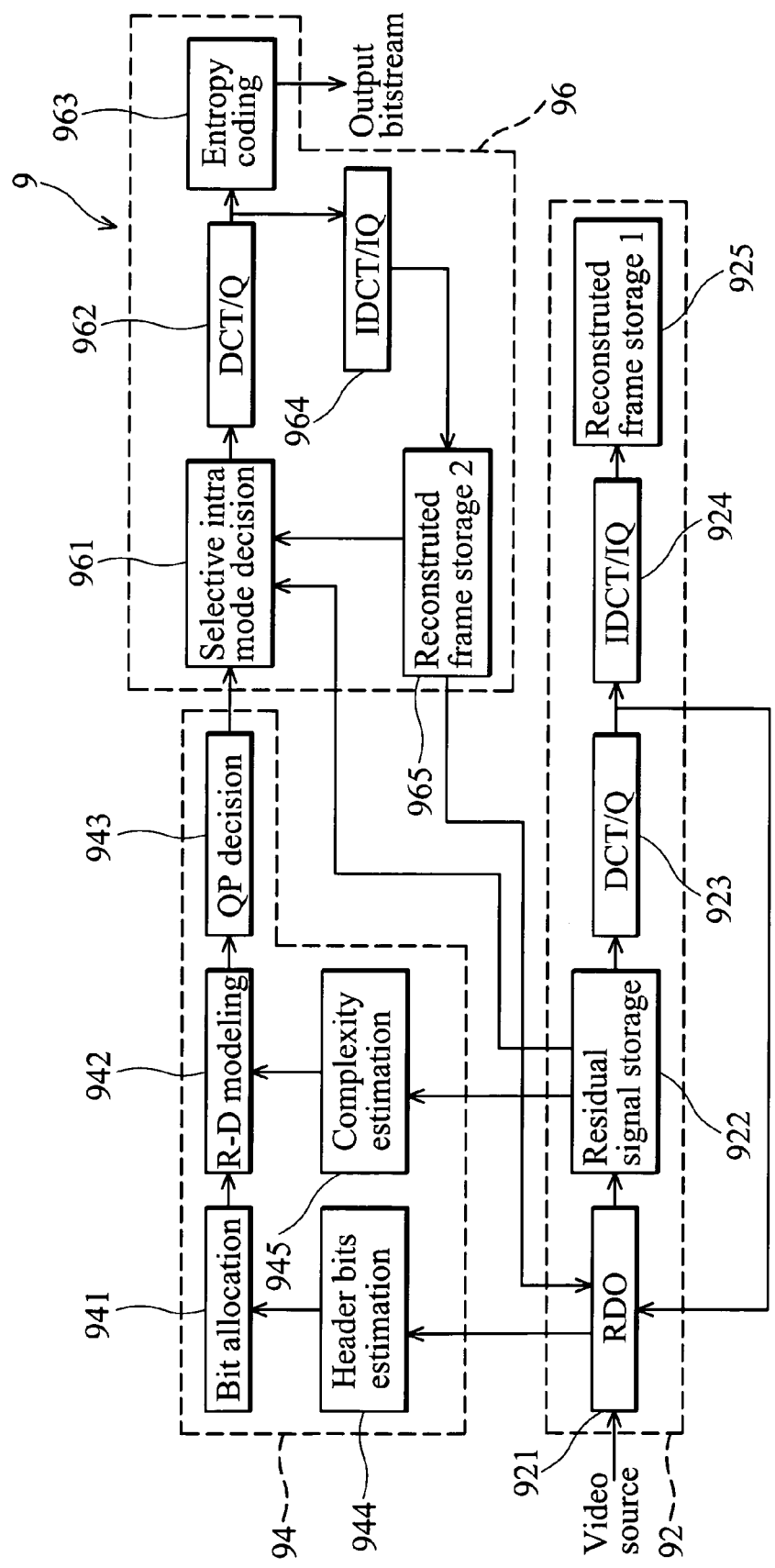
FIG. 9 is a block diagram illustrating an embodiment of a single-pass frame-layer rate control algorithm for an H.264 encoder with the two-step encoding scheme.

FIG. 9 is a block diagram illustrating an embodiment of a frame-layer rate control system 9. The rate control system 9 comprises a first-step encoding device 92, a rate control device 94, and a second-step encoding device 96. The first-step encoding device 92 is similar to the previous described video encoder except that an entropy coding unit is excluded herein. The first-step encoding device 92 comprises a RDO unit 921, a residual signal storage unit 922, a DCT and quantization unit 923, an inverse DCT and inverse quantization unit 924, and a first reconstructed frame storage 925. In the RDO unit 921, R-D optimized motion estimation and mode decision is first performed with $QP_G$, which is $QP_{n-1}$, for all MBs of the frame. Reference frames, MVs, as well as the residual signal of the frame retrieved from the RDO unit 921 are stored in the residual signal storage unit 922. A feature of H.264 that makes encoder rate control difficult to implement is the alternative use of intra prediction for encoding. MB is predicted from reconstructed values of neighboring pixels of the previous MBs in intra prediction modes. Due to intra prediction, each MB is reconstructed for encoding the subsequent MBs through the DCT and quantization units 923 and the inverse DCT and inverse quantization unit 924. The reconstructed frame output from the IDCT/IQ unit 924 is stored in the first reconstructed frame storage 925. For quantization and inverse quantization, $QP_G$ is also provided to and used in the DCT and quantization units 923 and the inverse DCT and inverse quantization unit 924.

The rate control device 94 updates parameters of a rate model and determines a QP for the current frame. The rate control device 94 comprises a header bits estimation unit 944, a complexity estimation unit 945, a bit allocation unit 941, an R-D modeling unit 942, and a QP decision unit 943. The header bit estimation unit 944 estimates the required number of header bits for all MBs in the current frame after the first-step encoding. Header information includes reference frames, MVs, MB modes, and CBP obtained in the first-step encoding device 92. The complexity estimation unit 945 computes a complexity of the residual signal to determine the QP value for quantization in the QP decision unit 943. An exemplary complexity measure algorithm will be provided hereafter. In the bit allocation unit 941, the adequate number of bits for a frame is allocated on the basis of available channel bandwidth, buffer status, or required quality of the frame. Different bit allocation methods can be applied according to the objective of rate control, for example, equal number of bits can be allocated to each frame for constant bit rate (CBR) applications, while in variable bit rate (VBR) applications, frame quality is a major factor that dominates the number of bits allocated to each frame. In the R-D modeling units 942, model parameters of the rate model are updated using complexities and the number of texture bits of several previously encoded frames by LSA method after the second-step encoding of each frame. A modified quadratic rate model is employed in the R-D modeling unit 942. In the QP decision units 943, the QP value, $QP_{RO}$ for quantizing the residual signal in the second-step encoding device 96 is determined using the rate model with the allocated number of bits for a frame and the complexity of the residual signal.

The second-step encoding device 96 is mainly for quantization and entropy coding to generate an encoded output bitstream. The second-step encoding device 92 comprises a selective intra mode decision unit 961, a DCT and quantization unit 962, an entropy coding unit 963, an inverse DCT and inverse quantization unit 964, and a second reconstructed frame storage 965. In the first-step encoding, RDO is performed with $QP_G$ and intra prediction is performed using neighboring reconstructed pixels of previous MBs with $QP_G$. The reconstructed frame generated in the first-step encoding device 92 is obtained through DCT, quantization, inverse quantization and inverse DCT with $QP_G$. Since quantization and inverse quantization are performed using $QP_{RO}$ in the second-step encoding device 96, the neighboring reconstructed pixels of previous MBs will be different from those in the first-step encoding if $QP_G$ and $QP_{RO}$ are different. The selective intra mode decision unit 961 is activated only when an MB mode is of mode "intra". For example, if the MB mode in the first-step encoding is one of the 4×4 intra modes, intra mode prediction is performed again and a new 4×4 intra mode is selected with $QP_{RO}$ in the second-step encoding. The complexity of the residual signal is computed again in the selective intra mode decision unit 961 as the residual signal is different after intra mode decision. Computational cost of intra prediction is not expensive compared to that of an entire RDO process, thus an increase of computational complexity caused by the selective intra mode decision unit 961 is insignificant in the system. There are only a few MBs encoded using intra MB modes in inter predicted frames unless a scene change occurs or significant motion exists. The output bitstream is generated through the DCT and quantization unit 962, where quantization is performed with $QP_{RO}$, and the entropy coding unit 963. After DCT and quantization, the frame is reconstructed again by the inverse DCT and inverse quantization unit 964, and the reconstructed frame is stored in the second reconstructed frame storage 965. The reconstructed frame generated from the IDCT/IQ unit 964 is used for intra prediction of subsequent MBs in the current frame and for inter prediction of subsequent frames.

Figure 10:
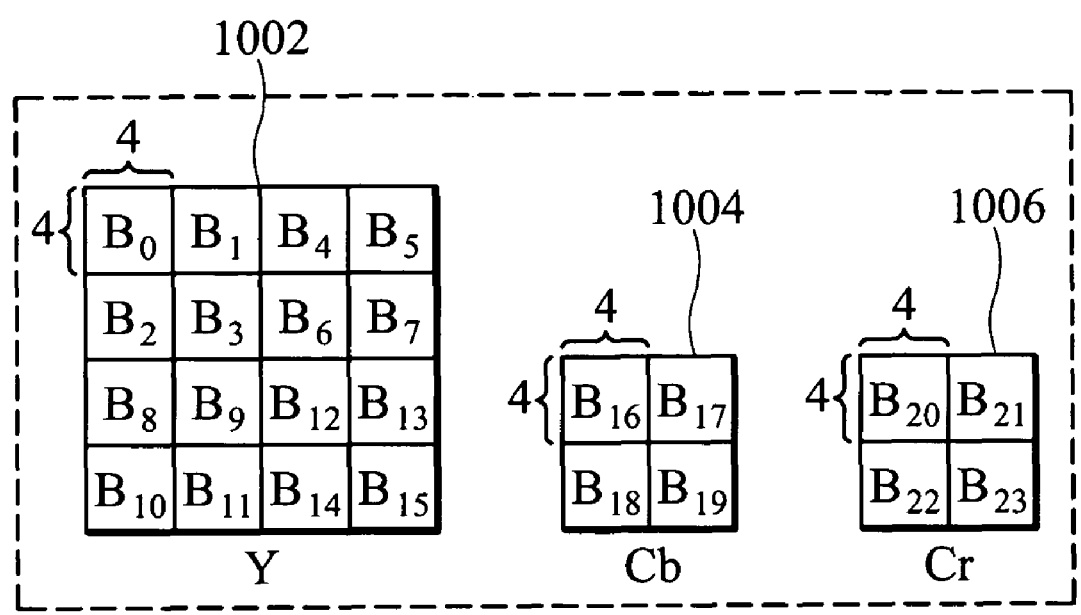
FIG. 10 illustrates a structure and numbering convention of MB.
Figure 11A:
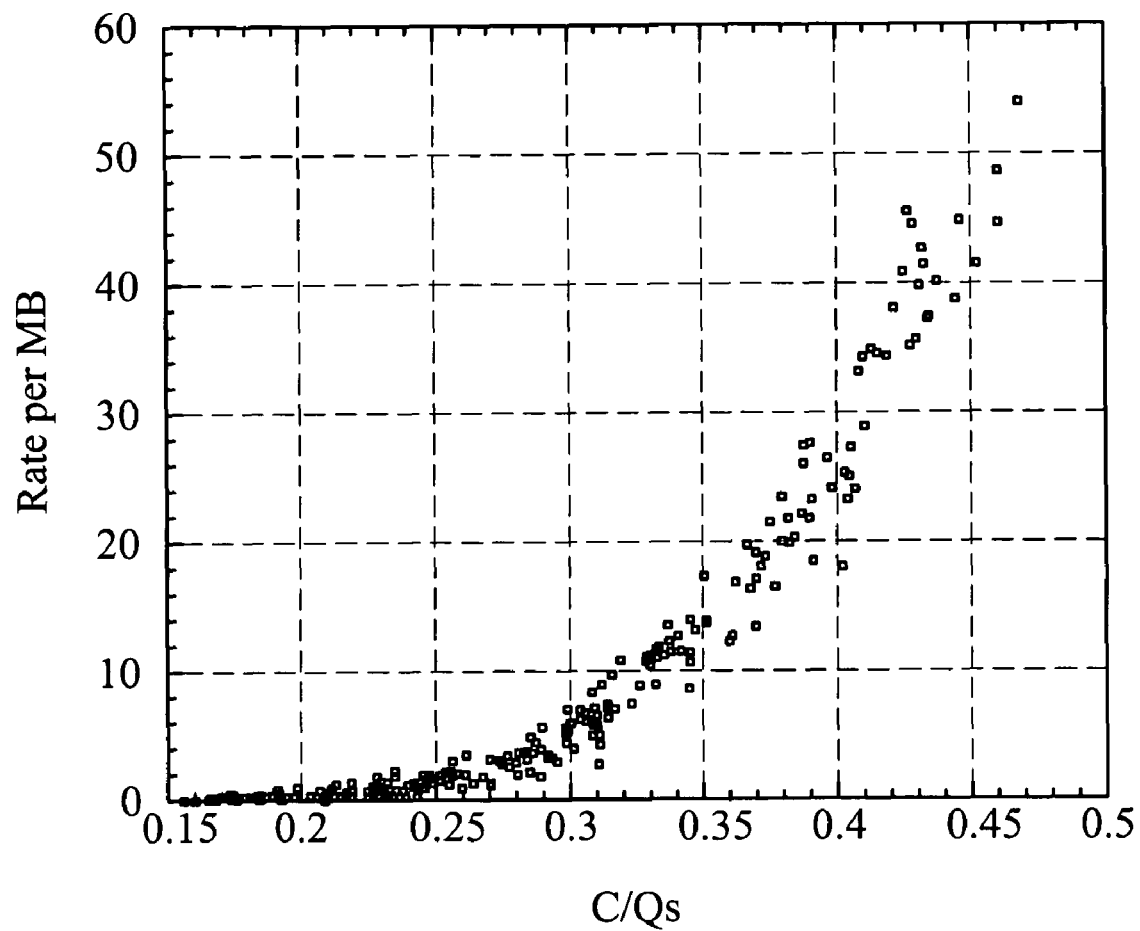
FIG. 11a~FIG. 11d show quadratic relationships between rate and C/Qs for the sequences ("suzie", "carphone", "salesman", and "table tennis") of a QCIF-format.
Figure 11B:
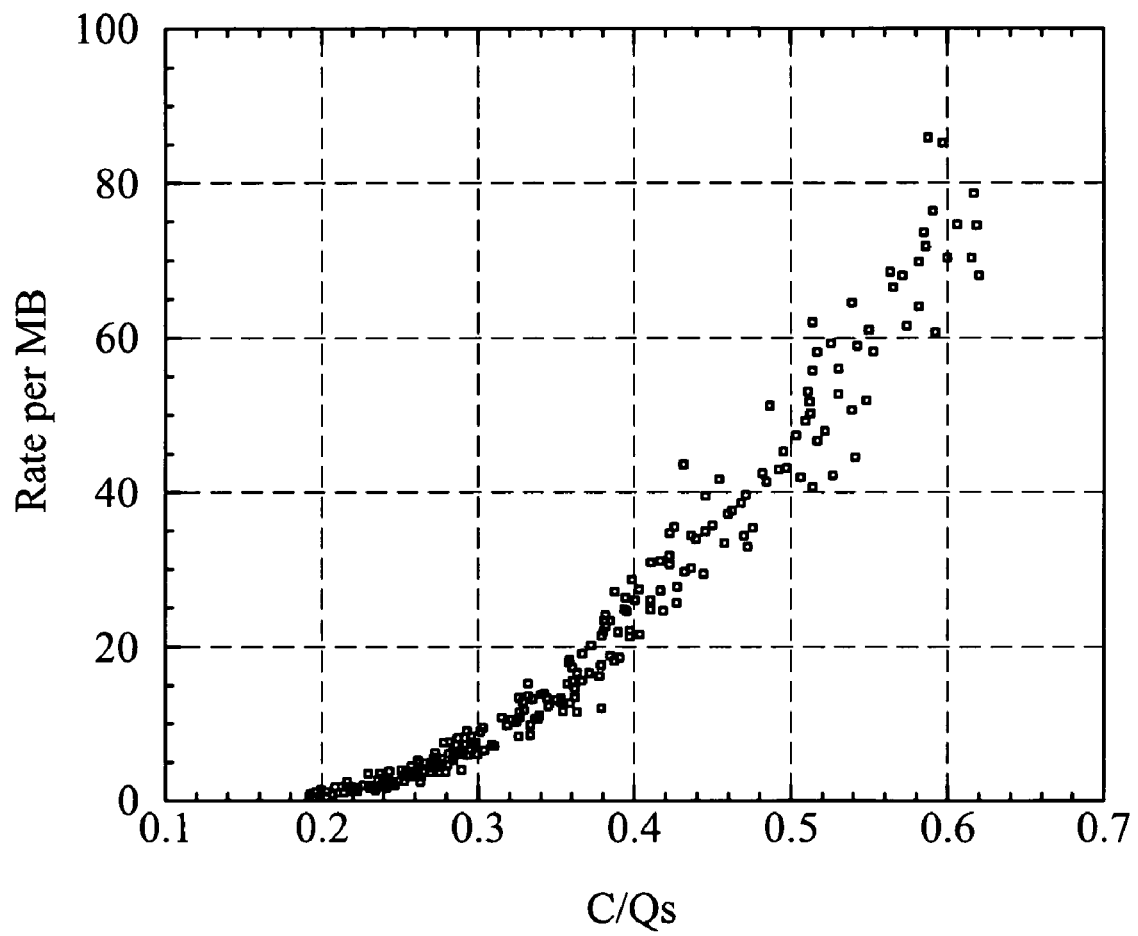
Figure 11C:
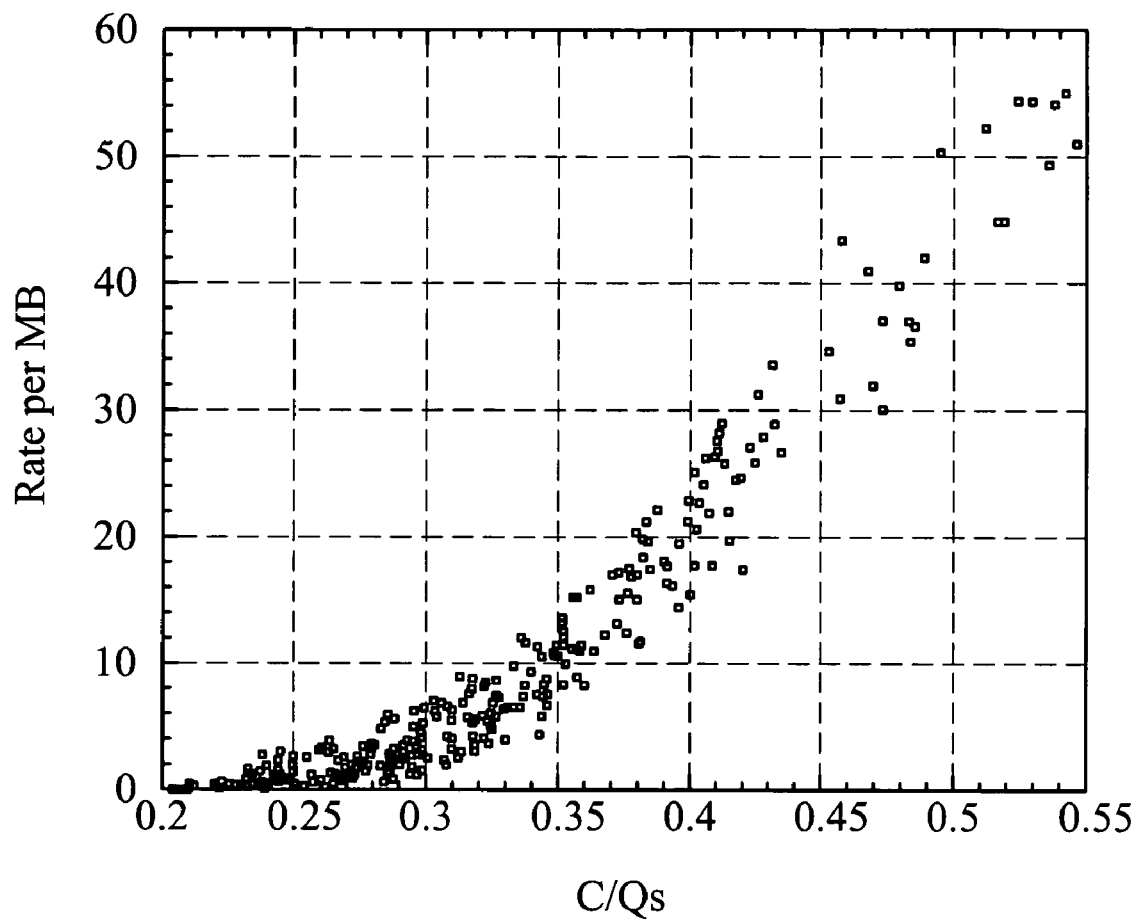
Figure 11D:
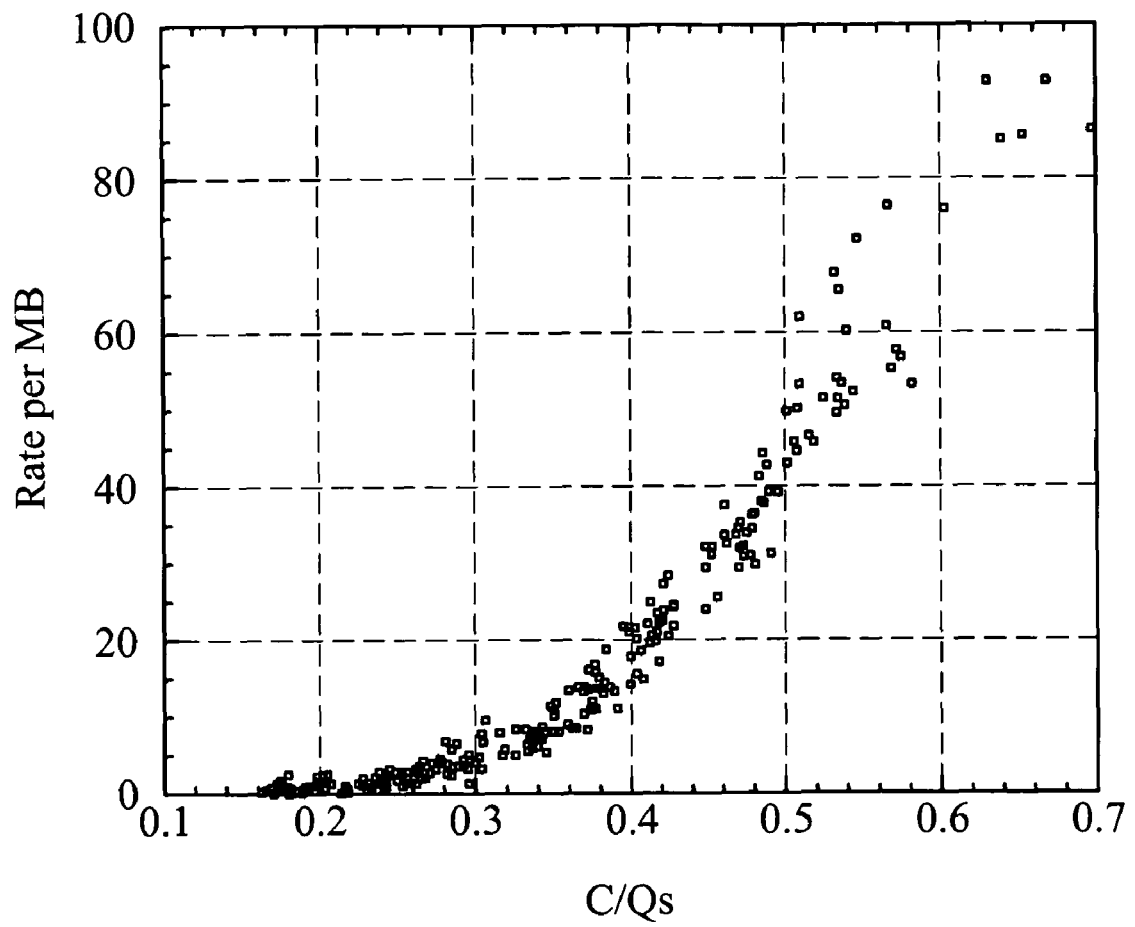
Figure 12A:
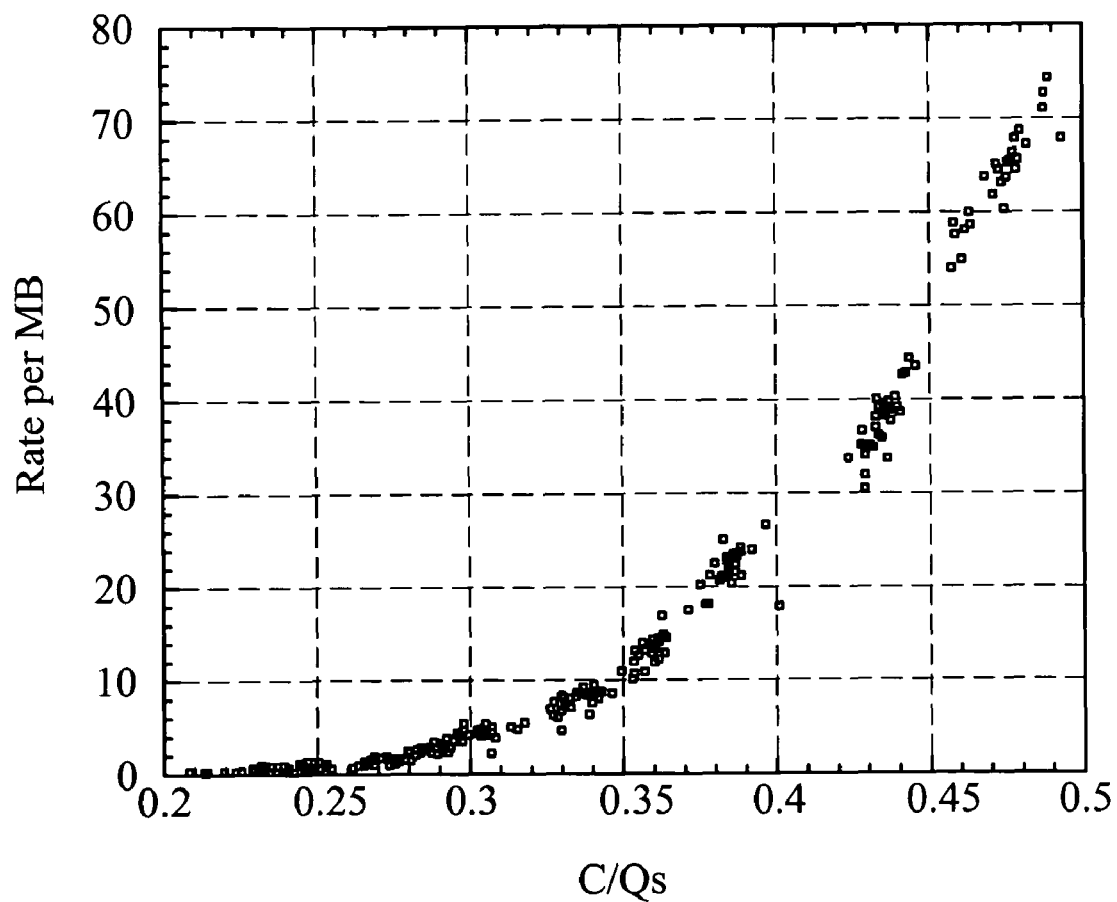
FIG. 12a~FIG. 12d show quadratic relationships between rate and C/Qs for the sequences ("waterfall",) "news", "mother & daughter", and "foreman") of CIF-format.
Figure 12B:
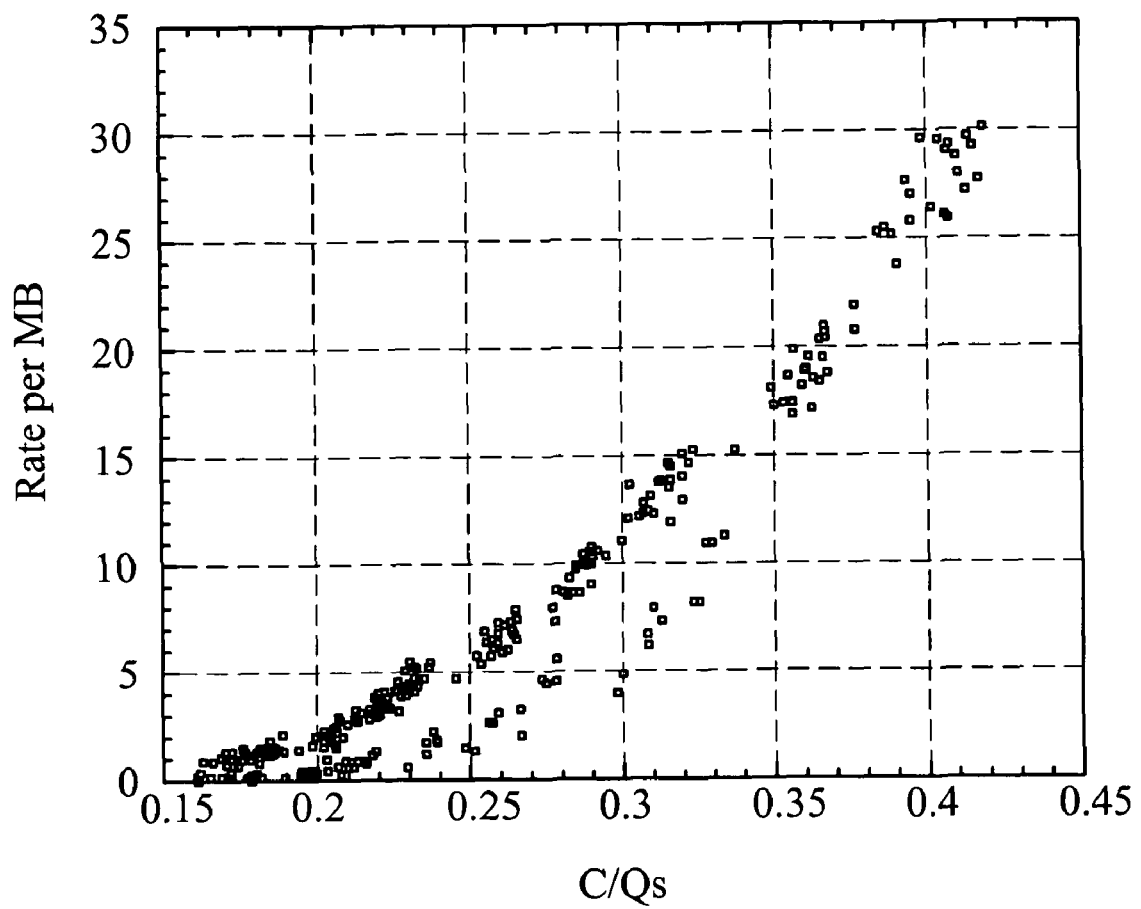
Figure 12C:
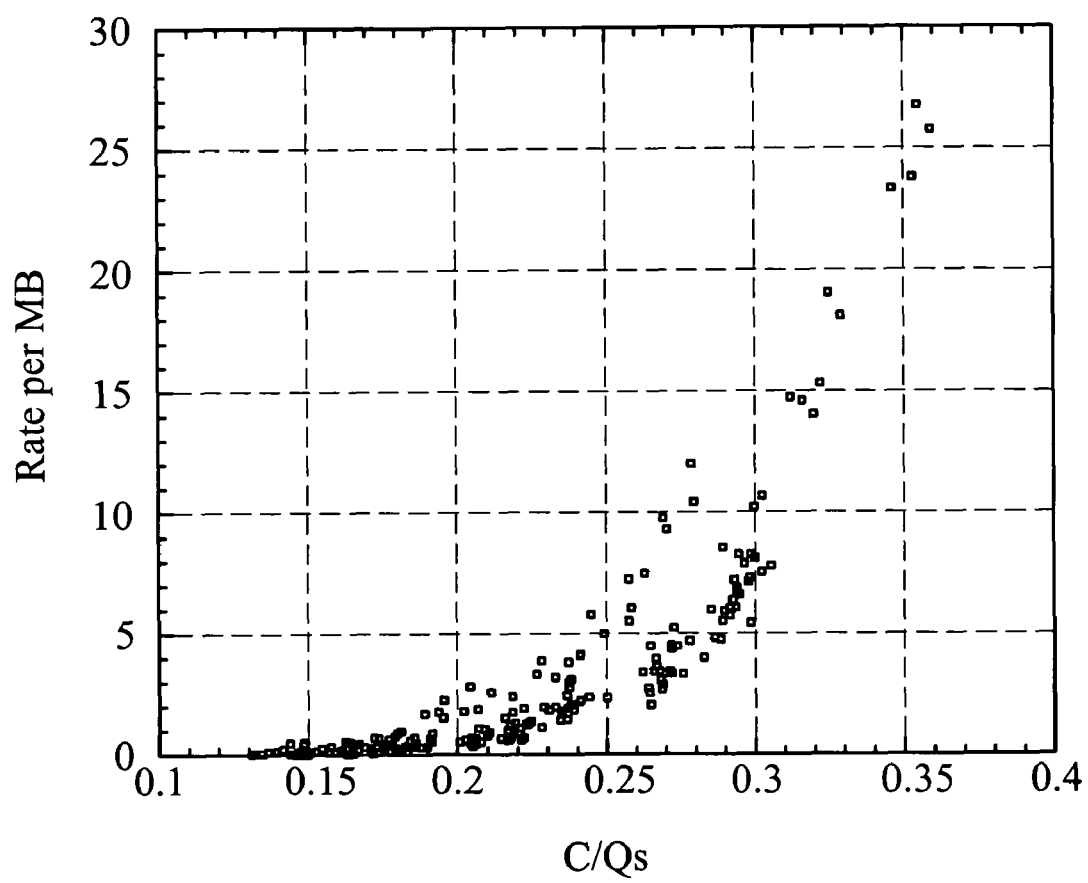
Figure 12D:
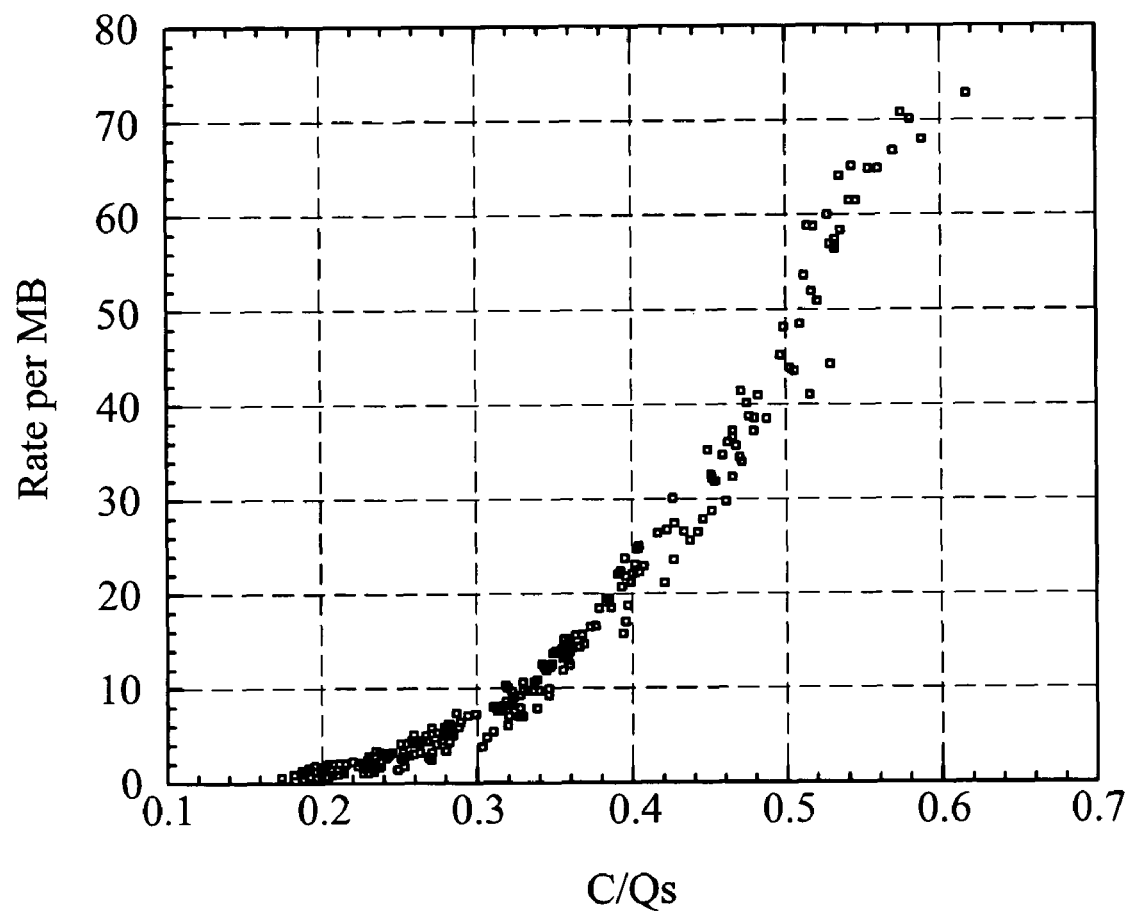

A frame-layer rate model with a complexity measure of the residual signal is also provided. A complexity measure, called modified SAD, is provided. In H.264, an 8×8 block is treated as an expensive block if it contains only single or expensive coefficients to encode. FIG. 10 illustrates block structure and numbering of an MB. There are four 8×8 blocks, thus a total of sixteen 4×4 blocks, in a luminance signal 1002, and an 8×8 block, thus four 4×4 blocks in each of the chrominance signals, Cb 1004 and Cr 1006. In H.264, each 4×4 DCT coefficient has its own cost, and coefficient cost of a 4×4 block, $CoeffCost_{4 \times 4}$, is the sum of coefficient costs of all 4×4 DCT coefficients. The H.264 encoder defines an 8×8 block as expensive one if coefficient cost of the 8×8 block, $CoeffCost_{8 \times 8}$, is less than a threshold:

if $CoeffCost_{8 \times 8} \leq T$, the 8×8 block is not encoded [9]

where $$CoeffCost_{8 \times 8} = \sum_{i=0}^{3} CoeffCost_{i, 4 \times 4}$$

Although the described coding method of DCT coefficients is not normative, it would be applied in the H.264 encoder due to the efficiency in the sense of R-D performance. According to the coding method of DCT coefficients, the 4×4 blocks with small coefficient costs are less relevant to the number of texture bits. As a result, the modified SAD method for complexity measure defines $SAD_i$ as the SAD of $B_i$ in FIG. 10, and the complexity of an MB, $C_{MB}$, is given by:

$$C_{MB} = \max\{SAD_0, \ldots, SAD_3\} + \max\{SAD_4, \ldots, SAD_7\} + \ldots + \max\{SAD_{20}, \ldots, SAD_{23}\} \quad [10]$$

In other words, a 4×4 block having the maximum SAD within each 8×8 block is chosen, and the complexity of an MB is defined as the sum of maximum SADs of the six chosen 8×8 blocks. The complexity of a frame, $C_{Frm}$, is defined as the sum of $C_{MB}$ of all MBs in the frame, as follows:

$$C_{Frm} = \sum_{i=0}^{N_{MB}} C_{i,MB} \quad [11]$$

where $N_{MB}$ is the number of MBs in the frame.

With the modified SAD as the complexity measure, a novel frame-layer rate model, which is called a modified quadratic rate model, is employed in some embodiments of frame-layer rate control. It can be shown that rate is proportional to the complexity measure and inversely proportional to the quantizer step-size, Qs. FIGS. 11a~11d and 12a~12d show the relationship between rate and $C_{Frm}$/Qs for QCIF-format and CIF-format sequences respectively. The rate represents the number of texture bits without the number of header bits. In FIGS. 11a~11d and 12a~12d, several frames of the sequences are encoded with various quantizer step-sizes, and the rates have a quadratic relationship with $C_{Frm}$/Qs in general. Therefore, the rate of a frame can be modeled as a quadratic function of $C_{Frm}$/QS as follows:

$$R(Qs) = X_1 \cdot \frac{C_{Frm}}{Qs} + X_2 \cdot \left(\frac{C_{Frm}}{Qs}\right)^2 \quad [12]$$

where $X_1$ and $X_2$ are model parameters, and Qs is the quantizer step-size.

After the second-step encoding, the model parameters are updated using the LSA method with data of the previous w frames whenever a frame is being encoded. The updated parameters are used to decide a quantizer step-size of the subsequent frame after the first-step encoding by simply solving quadratic equation given the target bit-rate. Experimental results show that the rate model using the modified SAD as a complexity measure can fit actual data better than using Equation 4.

Figure 13:
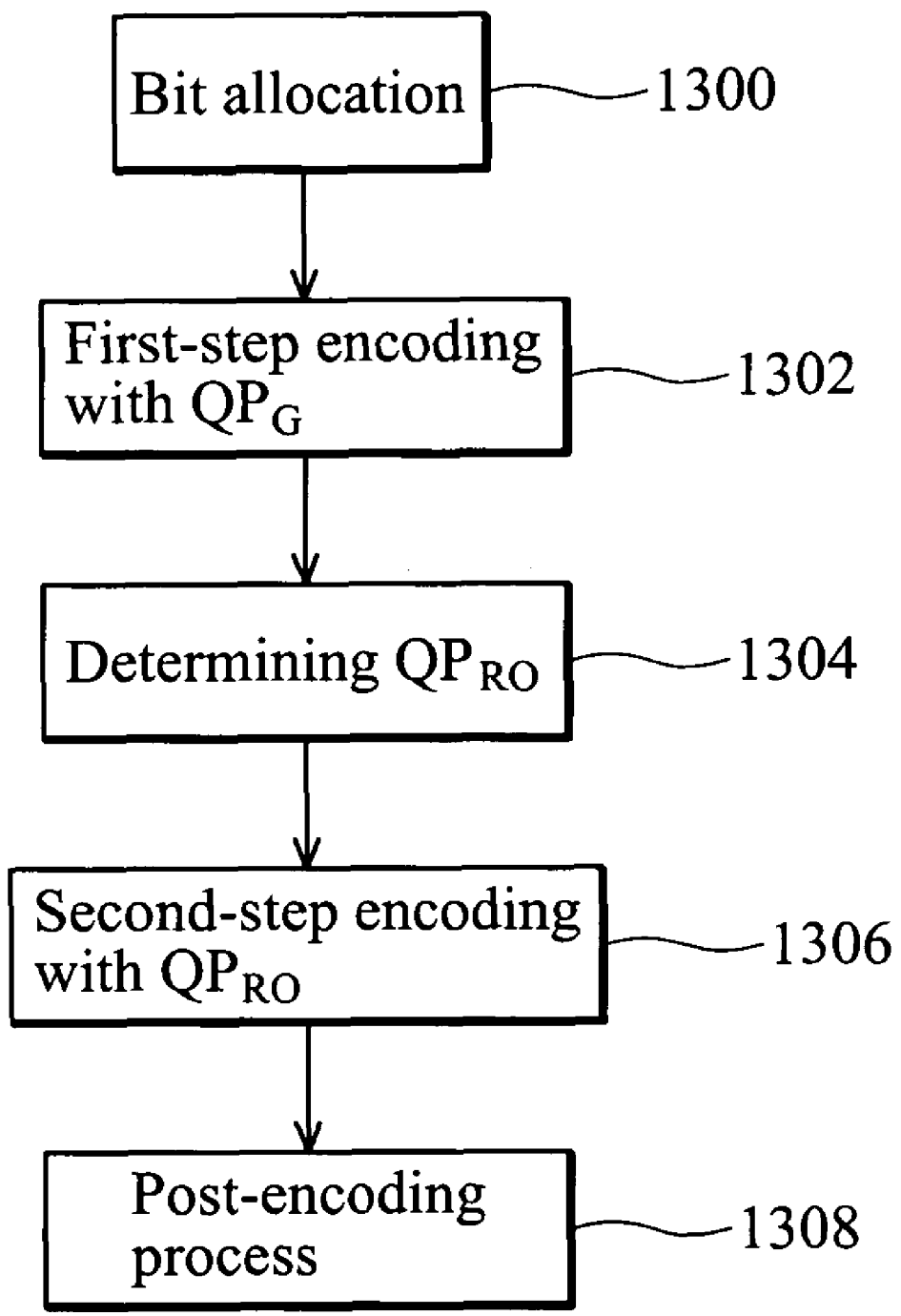
FIG. 13 is a flowchart illustrating an embodiment of a singe-pass frame-layer rate control method with a two-step encoding scheme.

FIG. 13 illustrates a flowchart of an embodiment of a single-pass frame-layer rate control method with a two-step encoding scheme. The single-pass frame-layer rate control method comprises steps of bit allocation 1300, first-step encoding with $QP_G$ 1302, determining $QP_{RO}$ 1304, second-step encoding with $QP_{RO}$ 1306, and post-encoding process 1308. In step 1300, the number of bits including texture bits and header bits for a frame is allocated. The number of bits is determined according to various factors such as buffer status, channel bandwidth, quality and so on. In some embodiments, the frame-layer rate control method is implemented under CBR channel, and the number of bits is determined using the bit allocation method in the MPEG-2 TM5 rate control algorithm.

The first-step encoding of the frame is performed with $QP_G$, a QP of the previous frame, in step 1302. R-D optimized motion estimation and mode decision is performed with $QP_G$ for all MBs in the frame. Information of all MBs such as MB modes, MVs, and reference frames, as well as residual signal is stored after performing RDO. Since intra prediction is performed using neighboring reconstructed pixels of previous MBs, the residual signal after RDO for an MB in each frame is reconstructed through DCT, quantization, inverse quantization and inverse DCT, and the reconstructed frame is stored for intra prediction of the subsequent MBs in the frame. Entropy encoding is not performed in the fist-step encoding 1302.

$QP_{RO}$ for quantizing the residual signal in the second-step encoding is determined in step 1304. The number of header bits and complexity of the frame are first estimated. The number of header bits and complexity of the frame can be estimated based on the information such as MVs, reference frames and MB modes, as well as residual signal obtained in the first-step encoding 1302. The number of header bits can be estimated by look-up tables, or by actually encoding header information using an entropy coder. Encoding header information using the entropy coder requires more computation, a more accurate estimation of the number of header bits can however be obtained. On the contrary, look-up tables give less accurate estimation while less computation is required. The complexity measure, a modified SAD, of the frame is estimated by using Equations 10 and 11. After estimating the number of header bits and the complexity of the frame, $QP_{RO}$ is obtained by solving the quadratic equation shown in Equation 12. Note that R(Qs) in Equation 12 here is defined as the allocated number of bits less the estimated number of header bits per frame. If the difference between $QP_G$ and $QP_{RO}$ is larger than 3 or $QP_{RO}$ is out of range, which is 0 to 51 in H.264, $QP_{RO}$ is clipped as follows:

if $QP_{RO} > QP_G + 3$, $QP_{RO} = QP_G + 3$ [13]

else if $QP_{RO} < QP_G - 3$, $QP_{RO} = QP_G - 3$ if $QP_{RO} > 51$, $QP_{RO} = 51$ [14]

else if $QP_{RO} < 0$, $QP_{RO} = 0$

The clipping method in Equation 13 smoothes the quality change between two consecutive frames, and minimizes a decrease of R-D performance by motion estimation and mode decision with $QP_G$ as shown in Equation 7.

The second-step encoding of a frame with $QP_G$ obtained in step 1304 is performed in step 1306. In the second-step encoding 1306, the residual signal obtained in the first-step encoding 1302 is quantized with $QP_G$. When an MB is intra coded in the first-step encoding 1302, intra prediction is again performed for this MB since the neighboring reconstructed pixels of the MB may not be the same when $QP_G$ and $QP_{RO}$ are different. The complexity of this MB should therefore be computed again so that the complexity of the frame is updated. The updated complexity is used to update the parameters of the rate model in the post-encoding process 1308. In step 1306, all header information of inter MBs obtained and stored in the first-step encoding 1302, the header information of intra MBs newly obtained in the second-step encoding 1306, and newly quantized DCT coefficients with $QP_{RO}$ are entropy coded to generate an output bitstream. The quantized DCT coefficients are reconstructed through inverse quantization and inverse DCT for intra prediction of the subsequent MBs in the frame and inter prediction of the subsequent frames.

The post-encoding process 1308 includes updating the parameters of the rate model of Equation 12 by the LSA method using the data of previous w frames as shown in Equation 15. In some embodiments, w is set to 20. The updated parameters are used to estimate a quantizer step-size for the second-step encoding 1306 of the subsequent frame. The buffer capacity level is also updated in step 1308.

$$X_1 = \frac{\left(\sum_{i=1}^{w} R_i \cdot \frac{C_i}{Qs_i}\right)\left(\sum_{i=1}^{w} \frac{C_i^4}{Qs_i^4}\right) - \left(\sum_{i=1}^{w} R_i \cdot \frac{C_i^2}{Qs_i^2}\right)\left(\sum_{i=1}^{w} \frac{C_i^3}{Qs_i^3}\right)}{\left(\sum_{i=1}^{w} \frac{C_i^2}{Qs_i^2}\right)\left(\sum_{i=1}^{w} \frac{C_i^4}{Qs_i^4}\right) - \left(\sum_{i=1}^{w} \frac{C_i^3}{Qs_i^3}\right)^2},$$

$$X_2 = \frac{\left(\sum_{i=1}^{w} R_i \cdot \frac{C_i^2}{Qs_i^2}\right) - X_1 \cdot \left(\sum_{i=1}^{w} \frac{C_i^3}{Qs_i^3}\right)}{\left(\sum_{i=1}^{w} \frac{C_i^4}{Qs_i^4}\right)}$$

[15]

where $R_i$, $C_i$, and Qs are rate, complexity, and quantizer step-size of $i^{th}$ previous frame respectively.

Note that R-D optimized motion estimation and mode decision in the two-step encoding scheme is performed only once for each MB in the first-step encoding except when an MB is intra coded, for which intra mode decision is performed again within possible intra modes in the second-step encoding. Therefore, even though DCT, quantization, inverse quantization, and inverse DCT are performed in both encoding steps, increase of computational complexity in the provided two-step encoding scheme is not significant compared to overall computational complexity.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A frame-layer rate control method performed in a video encoding system with single-pass frame rate control, comprising:
   allocating a target number of bits from a rate control device to a current frame;
   encoding macroblocks of the current frame by a first-step encoding device, which uses a quantizer parameter of a previous frame to obtain a residual signal and an estimated number of header bits of the current frame;
   evaluating a complexity of the current frame by the rate control device based on the residual signal of the current frame from the first-step encoding device; and
   determining a new quantizer parameter for the current frame by the rate control device based on the target number of bits, the estimated number of header bits, and the complexity of the current frame.

2. The method according to claim 1, wherein the encoding comprises:
   performing rate distortion optimized motion estimation and mode decision on the macroblocks of the current frames using the quantizer parameter of the previous frame, thus yielding a macroblock mode and motion vector for each macroblock within the current frame; and
   estimating the number of header bits of the current frame based on macroblock modes and motion vectors of the macroblocks within the current frame.

3. The method according to claim 2, wherein after the encoding, intra mode decision is performed again for intra coded macroblocks within the current frame.

4. The method according to claim 3, wherein each macroblock of the current frame comprises sixteen 4×4 blocks of luminance samples together with eight 4×4 blocks of chrominance samples, and wherein evaluating the complexity of the current frame comprises:
   calculating a sum of absolute difference for each of the twenty-four 4×4 blocks belonging to a macroblock within the current frame based on the residual signal of the current frame;
   measuring $C_{MB}$, a complexity for each macroblock within the current frame, by the following equation:

$$C_{MB} = \max\{SAD_0, \ldots, SAD_3\} + \max\{SAD_4, \ldots, SAD_7\} + \ldots + \max\{SAD_{20}, \ldots, SAD_{23}\}$$

where $SAD_i$ denotes the sum of absolute difference of an $i^{th}$ 4*4 block belonging to the macroblock; and calculating $C_{Frm}$, the complexity of the current frame, from:

$$C_{Frm} = \sum_{i=0}^{N_{MB}} C_{i,MB}$$

where $N_{MB}$ is the number of macroblocks within the current frame, and $C_{i,MB}$ denotes the complexity of an $i^{th}$ macroblock within the current frame.

5. The method according to claim 4, wherein the new quantizer parameter of the current frame is determined by solving a modified quadratic function of the form:

$$R(Qs) = X_1 \cdot \frac{C_{Frm}}{Qs} + X_2 \cdot \left(\frac{C_{Frm}}{Qs}\right)^2$$

where
   RQs is defined as the allocated target number of bits less the estimated number of header bits of the current frame,
   $X_1$ and $X_2$ are model parameters, and
   Qs is a quantizer step-size to be solved.

6. The method according to claim 5, wherein the complexity of a macroblock is re-calculated after the encoding if the intra mode decision is again performed on the macroblock, and the complexity of the current frame is updated accordingly.

7. The method according to claim 6 further comprising:
   performing discrete cosine transform and quantization with the new quantizer parameter on the residual signal of the current frame; and
   updating the model parameters of the modified quadratic function by the following equations:

$$X_1 = \frac{\left(\sum_{i=1}^{w} R_i \cdot \frac{C_i}{Qs_i}\right)\left(\sum_{i=1}^{w} \frac{C_i^4}{Qs_i^4}\right) - \left(\sum_{i=1}^{w} R_i \cdot \frac{C_i^2}{Qs_i^2}\right)\left(\sum_{i=1}^{w} \frac{C_i^3}{Qs_i^3}\right)}{\left(\sum_{i=1}^{w} \frac{C_i^2}{Qs_i^2}\right)\left(\sum_{i=1}^{w} \frac{C_i^4}{Qs_i^4}\right) - \left(\sum_{i=1}^{w} \frac{C_i^3}{Qs_i^3}\right)^2}$$

and $$X_2 = \frac{\left(\sum_{i=1}^{w} R_i \cdot \frac{C_i^2}{Qs_i^2}\right) - X_1 \cdot \left(\sum_{i=1}^{w} \frac{C_i^3}{Qs_i^3}\right)}{\left(\sum_{i=1}^{w} \frac{C_i^4}{Qs_i^4}\right)}$$

where w is the number of previous frames, and $R_i$, $C_i$, and $Q_{Si}$, denote rate, complexity, and quantizer step-size of an $i^{th}$ previous frame, respectively.

8. The method according to claim 5, wherein $QP_{RO}$, the new quantizer parameter of the current frame, is clipped as follows:

if $QP_{RO} > QP_G + \Delta$, $QP_{RO} = QP_G + \Delta$ else if $QP_{RO} < QP_G - \Delta$, $QP_{RO} = QP_G - \Delta$ where $QP_G$ denotes the quantizer parameter of the previous frame and $\Delta$ denotes a predetermined threshold.

9. The method according to claim 8, wherein the new quantizer parameter of the current frame is further constrained within a predetermined range.

10. A video encoding method performed in a video encoding system with single-pass frame rate control, comprising:

allocating a target number of bits from a rate control device to a current frame;

performing first-step encoding on macroblocks of the current frame by a first-step encoding device, which uses a quantizer parameter of a previous frame to obtain a residual signal and an estimated number of header bits of the current frame;

evaluating a complexity of the current frame by the rate control device based on the residual signal of the current frame from the first-step encoding device;

determining a new quantizer parameter for the current frame by the rate control device based on the target number of bits, the estimated number of header bits, and the complexity of the current frame; and performing second-step encoding on the residual signal of the current frame by a second-step encoding device, which uses the newly determined quantizer parameter.

11. The video encoding method according to claim 10, wherein the first-step encoding comprises:

performing rate distortion optimized motion estimation and mode decision on the macroblocks of the current frames using the quantizer parameter of the previous frame, thus yielding a macroblock mode and motion vector for each macroblcok within the current frame; and estimating the number of header bits of the current frame based on macroblock modes and motion vectors of the macroblocks within the current frame.

12. The video encoding method according to claim 11, wherein intra mode decision is performed again in the second-step encoding for intra coded macroblocks in the first-step encoding.

13. The video encoding method according to claim 11, wherein a first reconstructed frame is generated in the first-step encoding concerning the current frame for intra prediction of next macroblocks within the current frame, and a second reconstructed frame is generated in the second-step encoding concerning the current frame for intra prediction of next macroblocks within the current frame and for inter prediction of subsequent frames.

14. The video encoding method according to claim 12, wherein each macroblock of the current frame comprises sixteen 4×4 blocks of luminance samples together with eight 4×4 blocks of chrominance samples, and wherein evaluating the complexity of the current frame comprises:

calculating a sum of absolute difference for each of the twenty-four 4×4 blocks belonging to a macroblock within the current frame based on the residual signal of the current frame;

measuring $C_{MB}$, a complexity for each macroblock within the current frame, by the following equation:

$$C_{Mb} = \max\{SAD_0, \ldots, SAD_3\} + \max\{SAD_4, \ldots, SAD_7\} + \ldots + \max\{SAD_{20}, \ldots, SAD_{23}\}$$

where $SAD_i$ denotes the sum of absolute difference of an $i^{th}$ 4*4 block belonging to the macroblock; and calculating $C_{Frm}$, the complexity of the current frame, from:

$$C_{Frm} = \sum_{i=0}^{N_{MB}} C_{i,MB}$$

where $N_{MB}$ is the number of macroblocks within the current frame, and $C_{i,MB}$ denotes the complexity of an $i^{th}$ macroblock within the current frame.

15. The video encoding method according to claim 14, wherein the new quantizer parameter of the current frame is determined by solving a modified quadratic function of the form:

$$R(Qs) = X_1 \cdot \frac{C_{Frm}}{Qs} + X_2 \cdot \left(\frac{C_{Frm}}{Qs}\right)^2$$

where $RQs$ is defined as the allocated target number of bits less the estimated number of header bits of the current frame, $X_1$ and $X_2$ are model parameters, and $Qs$ is a quantizer step-size to be solved.

16. The video encoding method according to claim 15, wherein the complexity of a macroblock is re-calculated in the second-step encoding if the intra mode decision is again performed on the macroblock, and the complexity of the current frame is updated accordingly.

17. The video encoding method according to claim 15, wherein $QP_{RO}$, the new quantizer parameter of the current frame, is clipped as follows:

if $QP_{RO} > QP_G + \Delta$, $QP_{RO} = QP_G + \Delta$ else if $QP_{RO} < QP_G - \Delta$, $QP_{RO} = QP_G - \Delta$ where $QP_G$ denotes the quantizer parameter of the previous frame and $\Delta$ denotes a predetermined threshold.

18. The video encoding method according to claim 17, wherein the new quantizer parameter of the current frame is further constrained within a predetermined range.

19. The video encoding method according to claim 10, wherein the second-step encoding comprises:

performing discrete cosine transform (DCT) on the residual signal of the current frame, thus yielding DCT coefficients with respect to the current frame;

quantizing the DCT coefficients using the newly determined quantizer parameter; and generating an output bitstream by entropy encoding of the quantized DCT coefficients and header bits of the current frame.

20. A video encoding system with single-pass frame rate control, comprising:

a first-step encoding device operative to obtain a residual signal and an estimated number of header bits of a current frame by encoding macroblocks of the current frame using a quantizer parameter of a previous frame;

a rate control device operative to allocate a target number of bits to the current frame, to evaluate a complexity of the current frame based on the residual signal of the current frame, and to determine a new quantizer parameter for the current frame based on the target number of bits, the estimated number of header bits, and the complexity of the current frame; and a second-step encoding device operative to generate an output bitstream by encoding the residual signal of the current frame using the new quantizer parameter of the current frame.

21. The video encoding system according to claim 20, wherein the second-step encoding device comprises a selective intra mode decision unit being activated to perform intra mode decision again on macroblocks intra coded by the first-step encoding device.

22. The video encoding system according to claim 20, wherein the first-step encoding device performs rate distortion optimized motion estimation and mode decision on the macroblocks of the current frames using the quantizer parameter of the previous frame, yielding a macroblock mode and motion vector for each macroblcok within the current frame.

23. The video encoding system according to claim 22, wherein a first reconstructed frame is generated from the first-step encoding device for intra prediction of next macroblocks within the current frame, and a second reconstructed frame is generated from the second-step encoding device for intra prediction of next macroblocks within the current frame and for inter prediction of subsequent frames.

24. The video encoding system according to claim 23, wherein the rate control device comprises:
a header bit estimation unit estimating the number of header bits of the current frame based on macroblock modes and motion vectors of the macroblocks within the current frame; and
a complexity estimation unit evaluating the complexity of the current frame, each macroblock of which comprises sixteen 4×4 blocks of luminance samples together with eight 4×4 blocks of chrominance samples, by:
calculating a sum of absolute difference for each of the twenty-four 4×4 blocks belonging to a macroblock within the current frame based on the residual signal of the current frame;
measuring $C_{MB}$, a complexity for each macroblock within the current frame, by the following equation:

$$C_{MB} = \max\{SAD_0, \ldots, SAD_3\} + \max\{SAD_4, \ldots, SAD_7\} + \ldots + \max\{SAD_{20}, \ldots, SAD_{23}\}$$

where $SAD_i$ denotes the sum of absolute difference of an $i^{th}$ 4*4 block belonging to the macroblock; and
calculating $C_{Frm}$, the complexity of the current frame, from:

$$C_{Frm} = \sum_{i=0}^{N_{MB}} C_{i,MB}$$

where $N_{MB}$ is the number of macroblocks within the current frame, and $C_{i,MB}$ denotes the complexity of an $i^{th}$ macroblock within the current frame.

25. The video encoding system according to claim 24, wherein the rate control device determines the new quantizer parameter of the current frame by solving a modified quadratic function of the form:

$$R(Qs) = X_1 \cdot \frac{C_{Frm}}{Qs} + X_2 \cdot \left(\frac{C_{Frm}}{Qs}\right)^2$$

where
RQs is defined as the allocated target number of bits less the estimated number of header bits of the current frame,
$X_1$ and $X_2$ are model parameters, and
Qs is a quantizer step-size to be solved.

26. The video encoding system according to claim 25, wherein the complexity estimation unit of the rate control device re-calculates the complexity of a macroblock if the intra mode decision is again performed on the macroblock, and updates the complexity of the current frame accordingly.

27. The video encoding system according to claim 26, wherein after generation of the second reconstructed frame, the model parameters of the modified quadratic function are updated by the following equations:

$$X_1 = \frac{\left(\sum_{i=1}^{w} R_i \cdot \frac{C_i}{Qs_i}\right)\left(\sum_{i=1}^{w} \frac{C_i^4}{Qs_i^4}\right) - \left(\sum_{i=1}^{w} R_i \cdot \frac{C_i^2}{Qs_i^2}\right)\left(\sum_{i=1}^{w} \frac{C_i^3}{Qs_i^3}\right)}{\left(\sum_{i=1}^{w} \frac{C_i^2}{Qs_i^2}\right)\left(\sum_{i=1}^{w} \frac{C_i^4}{Qs_i^4}\right) - \left(\sum_{i=1}^{w} \frac{C_i^3}{Qs_i^3}\right)^2}$$

and $$X_2 = \frac{\left(\sum_{i=1}^{w} R_i \cdot \frac{C_i^2}{Qs_i^2}\right) - X_1 \cdot \left(\sum_{i=1}^{w} \frac{C_i^3}{Qs_i^3}\right)}{\left(\sum_{i=1}^{w} \frac{C_i^4}{Qs_i^4}\right)}$$

where w is the number of previous frames, and $R_i$, $C_i$, and $Q_{Si}$, denote rate, complexity, and quantizer step-size of an $i^{th}$ previous frame, respectively.

28. The video encoding system according to claim 25, wherein $QP_{RO}$, the new quantizer parameter of the current frame, is clipped by the rate control device as follows:

if $QP_{RO} > QP_G + \Delta$, $QP_{RO} = QP_G + \Delta$ else if $QP_{RO} < QP_G - \Delta$, $QP_{RO} = QP_G - \Delta$ where $QP_G$ denotes the quantizer parameter of the previous frame and $\Delta$ denotes a predetermined threshold.

29. The video encoding system according to claim 28, wherein the rate control device further constrains the new quantizer parameter of the current frame within a predetermined range.

30. The video encoding system according to claim 20, wherein the second-step encoding device comprises:
a discrete cosine transform (DCT) and quantization unit, transforming and quantizing the residual signal of the current frame, thus yielding quantized DCT coefficients with respect to the current frame; and
an entropy coding unit, entropy coding the quantized DCT coefficients and header bits of the current frame to generate the output bitstream.

31. The video encoding method according to claim 16 further comprising:
after the second-step encoding, updating the model parameters of the modified quadratic function by the following equations:

$$X_1 = \frac{\left(\sum_{i=1}^{w} R_i \cdot \frac{C_i}{Qs_i}\right)\left(\sum_{i=1}^{w} \frac{C_i^4}{Qs_i^4}\right) - \left(\sum_{i=1}^{w} R_i \cdot \frac{C_i^2}{Qs_i^2}\right)\left(\sum_{i=1}^{w} \frac{C_i^3}{Qs_i^3}\right)}{\left(\sum_{i=1}^{w} \frac{C_i^2}{Qs_i^2}\right)\left(\sum_{i=1}^{w} \frac{C_i^4}{Qs_i^4}\right) - \left(\sum_{i=1}^{w} \frac{C_i^3}{Qs_i^3}\right)^2}$$

and $$X_2 = \frac{\left(\sum_{i=1}^{w} R_i \cdot \frac{C_i^2}{Qs_i^2}\right) - X_1 \cdot \left(\sum_{i=1}^{w} \frac{C_i^3}{Qs_i^3}\right)}{\left(\sum_{i=1}^{w} \frac{C_i^4}{Qs_i^4}\right)}$$

where w is the number of previous frames, and $R_i$, $C_i$, and $Q_{Si}$, denote rate, complexity, and quantizer step-size of an $i^{th}$ previous frame, respectively.

* * * * *